(12) United States Patent
Miyata

(10) Patent No.: US 7,934,747 B2
(45) Date of Patent: May 3, 2011

(54) AIRBAG, AIRBAG DEVICE, AND VEHICLE

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/641,846

(22) Filed: Dec. 18, 2009

(65) Prior Publication Data

US 2010/0156077 A1   Jun. 24, 2010

(30) Foreign Application Priority Data

Dec. 19, 2008  (JP) ................. 2008-324019
Apr. 28, 2009  (JP) ................. 2009-109453

(51) Int. Cl.
   *B60R 21/231*  (2011.01)
   *B60R 21/233*  (2006.01)
(52) U.S. Cl. .............. 280/729; 280/743.1; 280/743.2
(58) Field of Classification Search ........... 280/729, 280/730.1, 743.1, 743.2
   See application file for complete search history.

(56) References Cited

U.S. PATENT DOCUMENTS

| 6,536,800 | B2 * | 3/2003 | Kumagai et al. | 280/743.1 |
| 6,581,964 | B2 * | 6/2003 | Braunschadel | 280/743.2 |
| 6,846,008 | B2 | 1/2005 | Kamiji et al. | |
| 2003/0230883 | A1 * | 12/2003 | Heym | 280/743.1 |
| 2009/0058056 | A1 * | 3/2009 | Yamada | 280/732 |

FOREIGN PATENT DOCUMENTS

| JP | 3746193 B2 | 6/2002 |
| JP | 2006-103654 A | 4/2006 |
| JP | 2008-254500 A | 10/2008 |

* cited by examiner

*Primary Examiner* — Eric Culbreth
*Assistant Examiner* — Joseph Rocca
(74) *Attorney, Agent, or Firm* — Fitch Even Tabin & Flannery

(57) ABSTRACT

An airbag comprises a right half airbag to be inflated on a front right side of an occupant, a left half airbag to be inflated on a front left side of the occupant, and a base-end chamber that communicates with base-end sides of the right half airbag and the left half airbag. A vertically extended concave portion exists on a surface of the inflated airbag that faces the occupant. The concave portion is deepest in the intermediate part and shallow in the upper and lower parts.

15 Claims, 30 Drawing Sheets

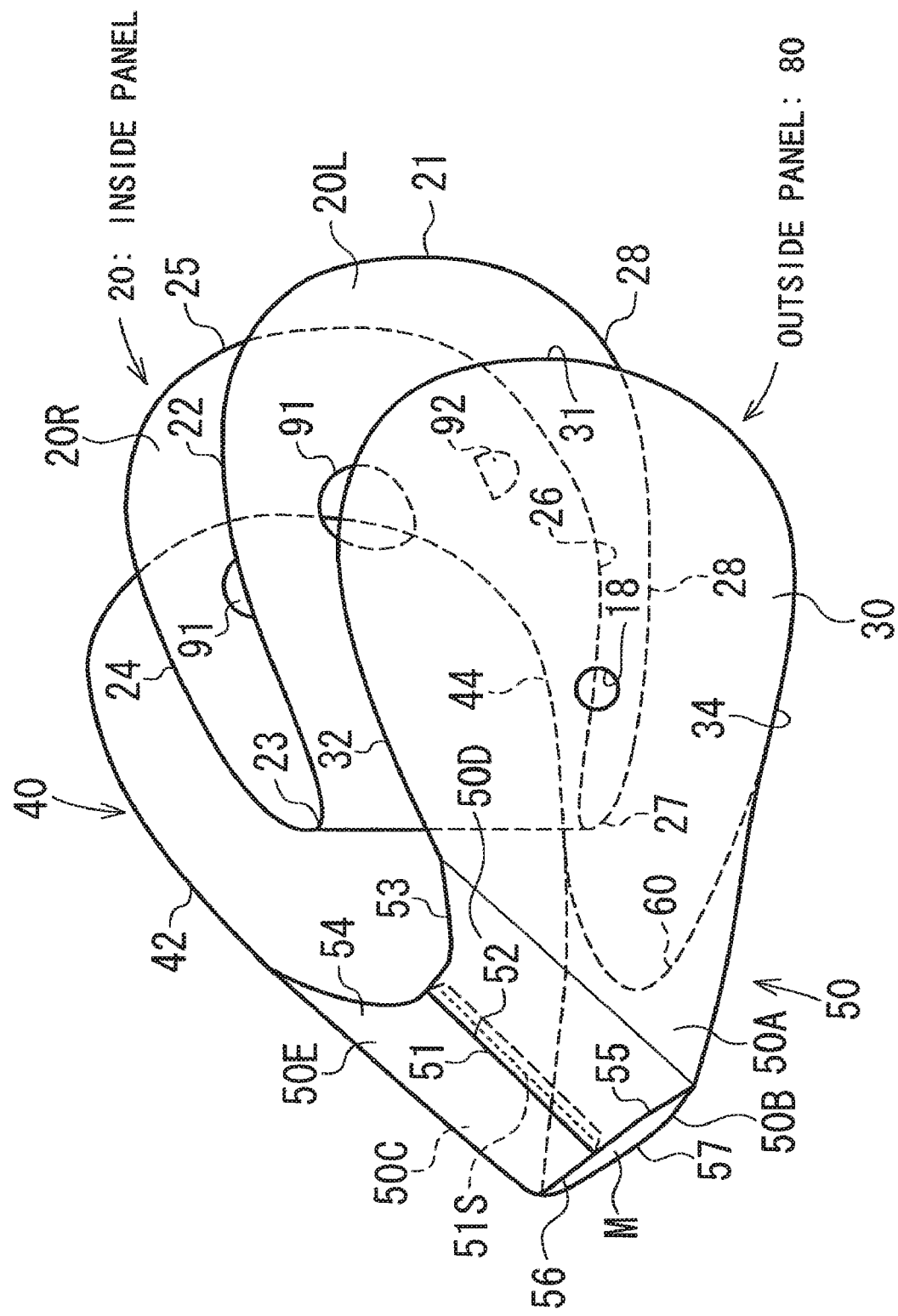

AIRBAG, AIRBAG DEVICE, AND VEHICLE

RELATED APPLICATIONS

This application claims priority under 35 U.S.C. §119 to Japanese Patent Application Nos. JP2008-324019 filed on Dec. 19, 2008 and JP2009-109453 filed on Apr. 28, 2009, the entire contents of which are hereby incorporated by reference.

FIELD OF THE INVENTION

The present invention relates to an airbag and an airbag device for restraining an occupant in the event of a vehicle collision or the like. More particularly, the present invention relates to an airbag and an airbag device in which a concave portion is formed in the vertical direction on an airbag surface facing the occupant when the airbag is in an inflated state. The present invention also relates to a vehicle provided with this airbag.

BACKGROUND OF THE INVENTION

JP, A, 2006-103654 describes an airbag for restraining an occupant in the event of a vehicle collision or the like, in which a concave portion is formed in the vertical direction on the airbag surface facing the occupant when the airbag is in an inflated state. Paragraph 0039 of the above prior art discloses that, in the event of a frontal collision, the shoulder portion of the occupant is restrained by a shoulder restraining portion located on both sides of the above-described concave portion of the inflated airbag, causing the head portion of the occupant to be restrained as it enters the concave portion.

Further, in this airbag, as shown in FIG. 4, the depth of the concave portion is shallowest in the vertical intermediate part, and gradually deepens upward and downward from this intermediate part.

SUMMARY OF THE INVENTION

It is therefore an object of the present invention to provide an airbag, an airbag device, and a vehicle equipped with this airbag device, suitable for receiving a small occupant in the event of a frontal collision.

In order to achieve the above-mentioned object, according to the first invention, there is provided an airbag comprising: a vertically extended concave portion formed so as to face a front-passenger seat occupant in an inflated state in front of the occupant; a depth of the concave portion in an intermediate part along a vertical direction being greater than both of a depth of the concave portion in an upper part and a depth of the concave portion in a lower part.

According to the second invention, in the first invention, the airbag further comprises: a base-end chamber disposed on a vehicle front side; a left half airbag that is continuous with the base-end chamber and is to be inflated on a front left side of the occupant; and a right half airbag that is continuous with the base-end chamber and is to be inflated on a front right side of the occupant; wherein: the left half airbag and the right half airbag are joined on mutually face-to-face portions, thereby forming the concave portion.

According to the third invention, in the airbag according to the second invention, the face-to-face portion of the left half airbag and the face-to-face portion of the right half airbag are joined by stitching.

According to the fourth invention, in the airbag according to the third invention, seams of the stitching includes: an upper seam that stitches together an upper part of the face-to-face portion of the left half airbag and an upper part of the face-to-face portion of the right half airbag; a middle seam that stitches together an intermediate part of the face-to-face portion of the left half airbag and an intermediate part of the face-to-face portion of the right half airbag; and a lower seam that stitches together a lower part of the face-to-face portion of the left half airbag and a lower part of the face-to-face portion of the right half airbag; wherein: at least a part of the middle seam is positioned on a vehicle front side, further away from a surface of the airbag facing an occupant than the upper seam and the lower seam, when the airbag is inflated.

According to the fifth invention, in the airbag according to the fourth invention, the upper seam, the lower seam, and the middle seam form a continuous seam that extends along a substantial vertical direction; and at least a part of the middle seam curves away from the surface facing the occupant.

According to the sixth invention, in the airbag according to the fourth invention, at least the upper seam and the middle seam are discontinuous; and an upper side of the middle seam is positioned closer to a vehicle front side than the upper seam.

According to the seventh invention, in the airbag according to the third invention, the left half airbag and the right half airbag are configured to be pressed together on a vehicle front side more than the intermediate part of the concave portion when the airbag is inflated.

According to the eighth invention, in the third invention, the airbag further comprises right-left tethers for decreasing a width along a lateral direction when the left half airbag and the right half airbag are inflated, wherein each of the right-left tethers is stitched to the left half airbag or the right half airbag by a seam of the stitching.

According to the ninth invention, in the airbag according to the first invention, in an airbag inflated state, a depth $d_1$ of the concave portion from the surface of the airbag facing the occupant in the upper part is 5 to 200 mm; in the airbag inflated state, a depth $d_2$ of the concave portion from the surface facing the occupant in the intermediate part is 25 to 400 mm; in the airbag inflated state, a depth $d_3$ of the concave portion from the surface facing the occupant in the lower part is 5 to 200 mm; and in the airbag inflated state, a depth $d_4$ of the intermediate part of the concave portion from a tangent line tangent to an inmost part of the upper part of the concave portion and an inmost part of the lower part of the concave portion is 0 to 200 mm.

According to the tenth invention, in the airbag according to the ninth invention, the concave portion in the intermediate part is a portion having the depth $d_2$ is 25 to 400 mm, and the concave portion in the intermediate part extends 150 to 400 mm in a vertical direction.

According to the eleventh invention, in the airbag according to the tenth invention, in the intermediate part, the more the concave portion is in an upper part, the more a depth of the concave portion is greater.

According to the twelfth invention, in the airbag according to the ninth invention, the concave portion in the intermediate part is configured so that a direction of a tangent line within a vertical plane of at least one portion of an inmost part of the concave portion is inclined toward a vehicle front.

According to the thirteenth invention, in the first invention, the airbag further comprises at least one front-back tether for pulling the concave portion of the intermediate part toward a vehicle front.

In order to achieve the above-mentioned object, according to the fourteenth invention, there is provided an airbag comprising: a vertically extended concave portion formed so as to face a front-passenger seat occupant in an inflated state in front of the occupant; a base-end chamber disposed on a vehicle front side; a left half airbag that is continuous with the base-end chamber and is to be inflated on a front left side of the occupant; and a right half airbag that is continuous with the base-end chamber and is to be inflated on a front right side of the occupant; wherein: the left half airbag and the right half airbag are joined on mutually face-to-face portions, thereby forming the concave portion, and seams of the stitching includes a main seam that stitches together the face-to-face portion of the left half airbag and the face-to-face portion of the right half airbag in a continuous manner from a lower part to an upper part, and the main seam extends in a manner that the more the main seam is in an upper side, the more the main seam is positioned closer to a vehicle front side.

According to the fifteenth invention, in the airbag according to the fourteenth invention, the main seam extends in a substantially linear shape inclined frontward in a manner that in at least an intermediate part of the concave portion along a vertical direction, the more the main seam is in an upper side, the more the main seam is positioned closer to a vehicle front side.

According to the sixteenth invention, in the airbag according to the fourteenth invention, the seams of the stitching further includes an upper seam that stitches together the upper part of the face-to-face portion of the left half airbag and the upper part of the face-to-face portion of the right half airbag; and the upper seam is positioned closer to a vehicle rear than an upper end of the main seam when the airbag is inflated.

According to the seventeenth invention, in the first or fourteenth invention, the airbag further comprises a hollow portion that passes in the substantially vertical direction through the airbag in an inflated state that the airbag inflates from an instrument panel of a the vehicle toward a vehicle rear so as to approach the occupant; wherein: the hollow portion is configured so that, when the airbag is in the inflated state, at least one portion of a lower end side of the hollow portion is positioned closer to a vehicle rear than an end portion on a vehicle rear side of the instrument panel.

According to the eighteenth invention, there is provided the airbag device having the airbag in the first or fourteenth invention and an inflator that inflates the airbag.

According to the nineteenth invention, there is provided a vehicle having the airbag device in the eighteenth invention.

According to the airbag and airbag device of the present invention, a vertically extended concave portion is provided on the surface of the airbag facing the occupant. The vertical intermediate part of this concave portion is deeper than the upper and lower parts. In a case where a frontal collision occurs when a small occupant is seated in the front-passenger seat, the head portion of the small occupant enters near the intermediate part of the concave portion so that it is sandwiched between both side sections of the concave portion. As a result, the forward moving velocity of the head portion does not suddenly decrease. The left and right sides of the thorax of the occupant are received by both side sections of the concave portion.

According to an aspect of the present invention, the airbag comprises a left half airbag to be inflated on a front left side of an occupant, and a right half airbag to be inflated on a front right side of the occupant. Then, the face-to-face portions of the left half airbag and the right half airbag are joined, thereby forming the concave portion.

When the airbag inflates in the event of a frontal collision, the left half airbag receives the left side of the thorax of the occupant, and the right half airbag receives the right side of the thorax of the occupant. The left and right sides of the thorax of the occupant have hard strong ribs. The airbag receives and absorbs an impact to the occupant through the ribs. The airbag has a valley-shaped concave portion between the front ends of the left half airbag and the right half airbag in an inflated state. The vicinity near the breastbones at the center of the thorax of the occupant faces the concave portion. Accordingly, when the body of the occupant plunges into the airbag, the vicinity of the breastbones does not receive a large reaction force of the airbag, thereby decreasing a load on the breastbones.

In the present invention, the face-to-face portions of the left half airbag and the right half airbag may be joined by stitching.

The seam of this stitching may be configured to provide an upper seam that stitches together the upper parts of the face-to-face portions of the left half airbag and the right half airbag, a middle seam that stitches together the intermediate parts of the face-to-face portions of the left half airbag and the right half airbag, and a lower seam that stitches together the lower parts of the face-to-face portions of the left half airbag and the right half airbag, wherein at least one portion of the middle seam is positioned on the vehicle front side, further away from the surface of the airbag facing the occupant than the upper and lower seams. In such a case, the inmost parts of the concave portion are these seams. Since at least one portion of the middle seam is positioned on the vehicle front side further away from the surface of the airbag facing the occupant than the upper and lower seams, the depth of the intermediate part of the concave portion is greater than the depths of the upper and lower parts of the concave portion.

The upper, lower, and middle seams may form a continuous seam that extends in the substantial vertical direction. In such a case, at least one portion of the middle seam curves away from the surface facing the occupant, thereby increasing the depth of the intermediate part of the concave portion further than the depths of the upper and lower parts of the concave portion.

Of the upper, middle, and lower seams, at least the upper seam and middle seam may be discontinuous. In such a case, if the upper end of the middle seam is positioned closer toward the vehicle front side than the upper seam, the depth of the intermediate part of the concave portion becomes greater than the depth of the upper part of the concave portion.

According to another aspect of the present invention, the left half airbag and the right half airbag are pressed together closer to the vehicle front side than the intermediate part of the concave portion, when the airbag is in an inflated state. When the head portion of the occupant comes in contact with this intermediate part in the event of a vehicle collision, the head portion presses apart and enters between the left half airbag and the right half airbag, and the impact is absorbed therebetween.

According to the present invention, the airbag may further include right-left tethers for restricting the horizontal widths of the left half airbag and the right half airbag in the inflated state. With this arrangement, the vehicle rear sides of the left half airbag and the right half airbag protrude further toward the occupant when the airbag is fully inflated, making it possible to restrict the lateral width of the concave portion. Further, the right-left tethers also make it possible to increase the length in the vehicle front-back direction of the area where the left half airbag and the right half airbag are pressed together.

In the present invention, a depth $d_1$ of the concave portion from the surface of the airbag facing the occupant in the upper part is preferably 5 to 200 mm, a depth $d_2$ of the concave portion from the surface facing the occupant in the intermediate part is preferably 25 to 400 mm, a depth $d_3$ of the concave portion from the surface facing the occupant in the lower part is preferably 5 to 200 mm, and a depth $d_4$ of the intermediate part of the concave portion from the line tangent to the inmost parts of the upper part and the lower part of the concave portion is preferably 0 to 200 mm. With such a configuration, the head portion of a small occupant can enter deeply into the vicinity of the intermediate part of the concave portion.

According to an aspect of the present invention, the concave portion of the intermediate part is a part that has a depth of 25 to 400 mm and extends vertically 150 to 400 mm.

According to an aspect of the present invention, in the concave portion of the intermediate part, the depth of the concave portion is as deep as the upper side. With such a configuration, the head portion of a small occupant that has entered the concave portion in a forward leaning position enters deeply into this concave portion. As a result, the head portion of the small occupant is securely held within the concave portion, without shifting left and right.

In the present invention, in the intermediate part of the concave portion, the tangential direction within the vertical plane of the inmost part is at least partially inclined forward toward the vehicle front. In such a case, when the face of a small occupant reaches the inmost part of the concave portion, the face substantially matches this tangential direction, thereby minimizing the load on the neck of the small occupant.

When a frontal collision occurs with a large occupant in the front-passenger seat, the head portion of the occupant is received by the concave portion of the airbag upper part, and the left and right sides of the thorax are received by both side sections of the concave portion.

According to the present invention, the concave portion of the intermediate part may be pulled by a front-back tether toward the vehicle front, thereby increasing the depth of the vertical intermediate part of the concave portion further than the depths of the upper and lower parts of the concave portion.

According to the airbag and airbag device of the present invention, the airbag comprises a left half airbag to be inflated on a front left side of an occupant, and a right half airbag to be inflated on a front right side of the occupant. Then, because the face-to-face portions of the left half airbag and the right half airbag are stitched together by a seam, a vertically extended concave portion facing the occupant is formed when the airbag is in an inflated state. The seam of this stitching includes a main seam that continuously stitches the two face-to-face portions from the lower part to the upper part, and the main seam extends to the vehicle front side to the extent of the upper side. That is, when the airbag is in an inflated state, the depth of the concave portion is as deep as the upper side of the concave portion. In a case where a frontal collision occurs when a small occupant is seated in the front-passenger seat, the head portion of the small occupant enters near the intermediate part of the concave portion so that it is sandwiched between both side sections of the concave portion, thereby preventing any sudden decrease in the forward moving velocity of the head portion. The left and right sides of the thorax of the occupant are received by both side sections of the concave portion.

According to aspect of the present invention, the main seam of the airbag extends substantially linearly on a forward angle, reaching the vehicle front side to the extent of the upper side, in at least the vertical intermediate part of the concave portion. According to this airbag, because the inmost part in the intermediate part of the concave portion inclines forward along the main seam, when the face of a small occupant reaches the inmost part of the concave portion, the face substantially matches the direction in which this inmost part extends, thereby minimizing the load on the neck of the small occupant. Further, in the intermediate part of this concave portion, because the depth of the concave portion is as deep as the upper side, the head portion of a small occupant that has entered the concave portion in a forward leaning position enters deeply into the concave portion. As a result, the head portion of the small occupant is securely held within the concave portion, without shifting left and right.

The seam of this stitching may further comprise an upper seam that stitches together the upper parts of the face-to-face portions of the left half airbag and the right half airbag closer to the vehicle rear than the upper end of the main seam. In such a case, the upper part of the concave portion is shallower than the intermediate part. When a frontal collision occurs with a large occupant in the front-passenger seat, the head portion of the occupant is received by the concave portion of the airbag upper part, and the left and right sides of the thorax are received by both side sections of the concave portion. With the concave portion shallower in the airbag upper part in this manner, it is possible to maintain the front-back stroke of the airbag required to restrain the head portion of a large occupant.

According to the present invention, the airbag may further comprise a hollow portion that passes substantially vertically through the inflated airbag, wherein at least a part of the lower end of the hollow portion is positioned closer to the vehicle rear than the end portion on the vehicle rear side of the instrument panel when the airbag is inflated. With this arrangement, even if an object is present in the vicinity of the instrument panel, the object is engulfed in the hollow portion when the airbag inflates.

BRIEF DESCRIPTION OF THE DRAWINGS

FIG. 11 is an exploded perspective view of the airbag shown in FIG. 1.

DETAILED DESCRIPTION OF THE PREFERRED EMBODIMENTS

Embodiments of the present invention will now be described with reference to accompanying drawings.

Figure 1:
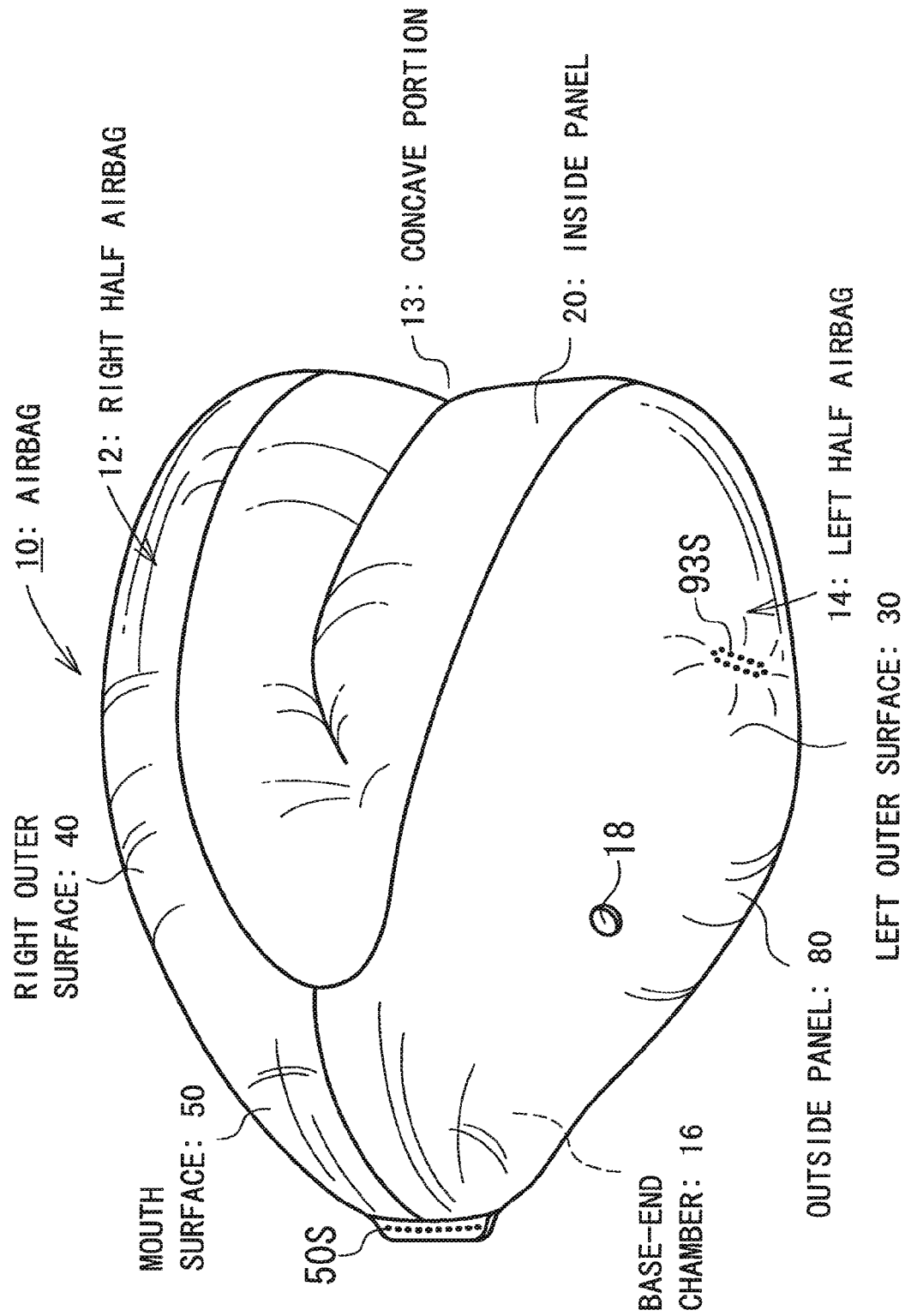
FIG. 1 is a perspective view of an airbag according to an embodiment of the present invention.
Figure 2:
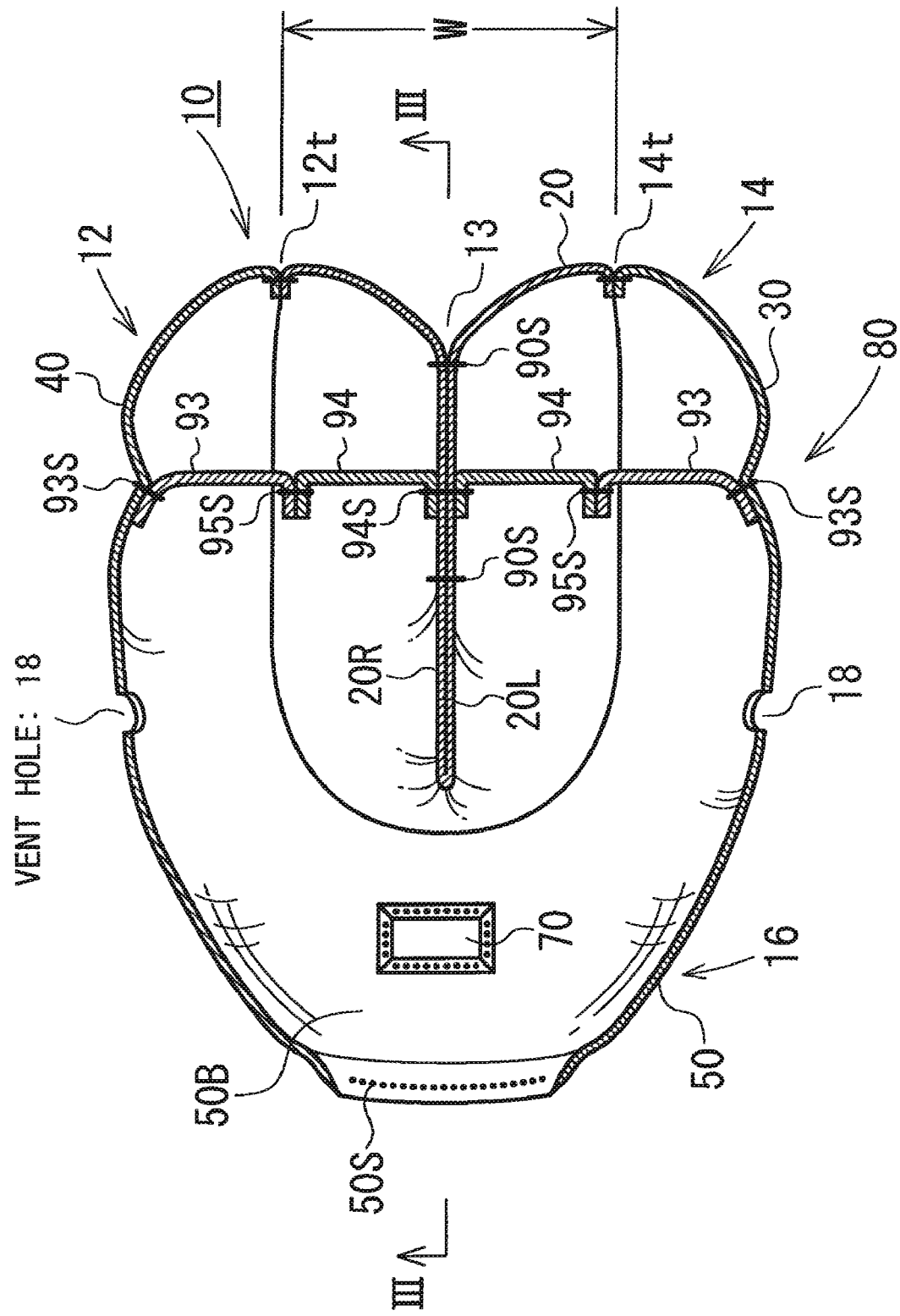
FIG. 2 is a horizontal cross-sectional view of the airbag shown in FIG. 1.
Figure 3:
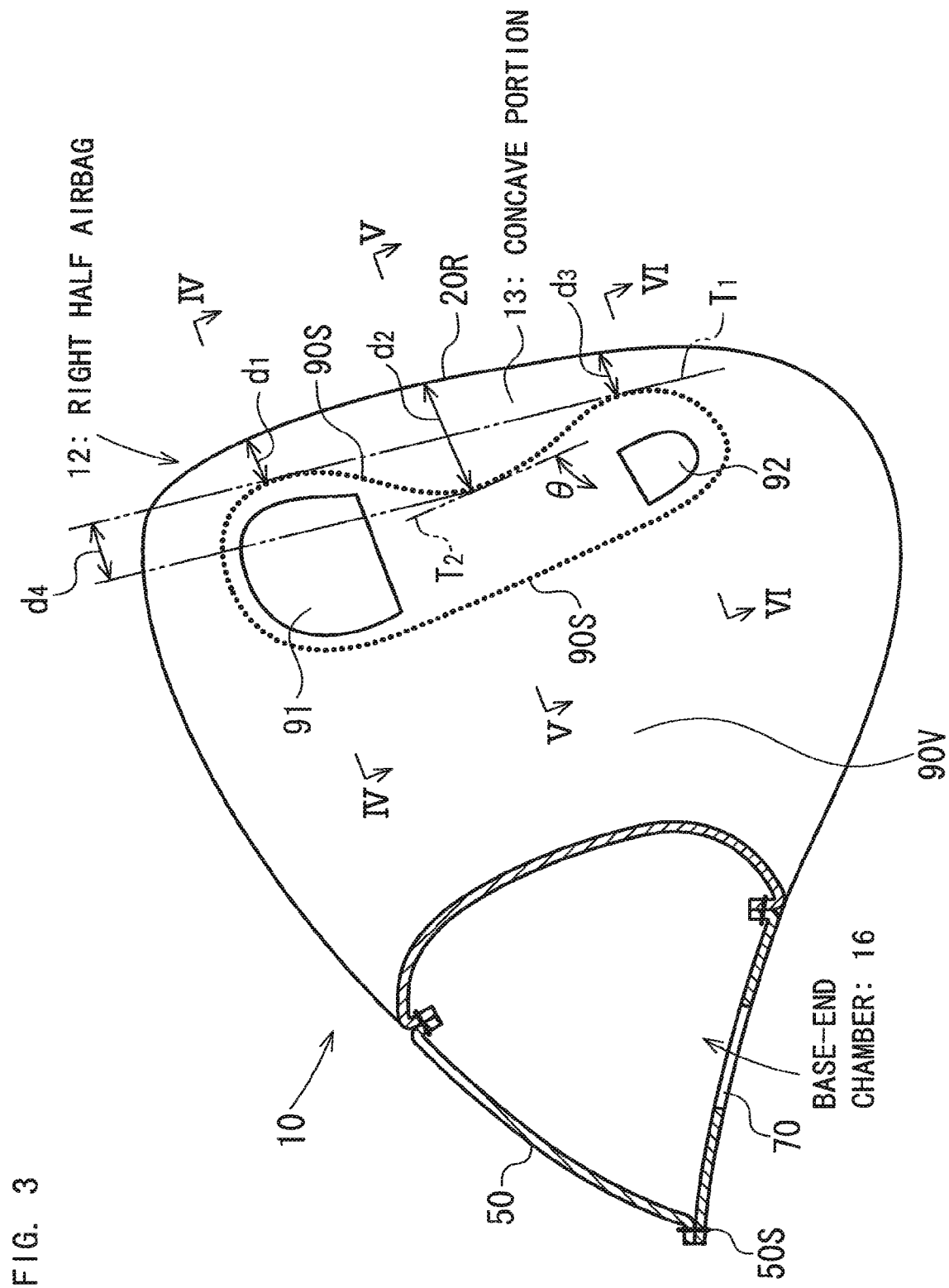
FIG. 3 is a cross-sectional view taken along line in FIG. 2.
Figure 4:
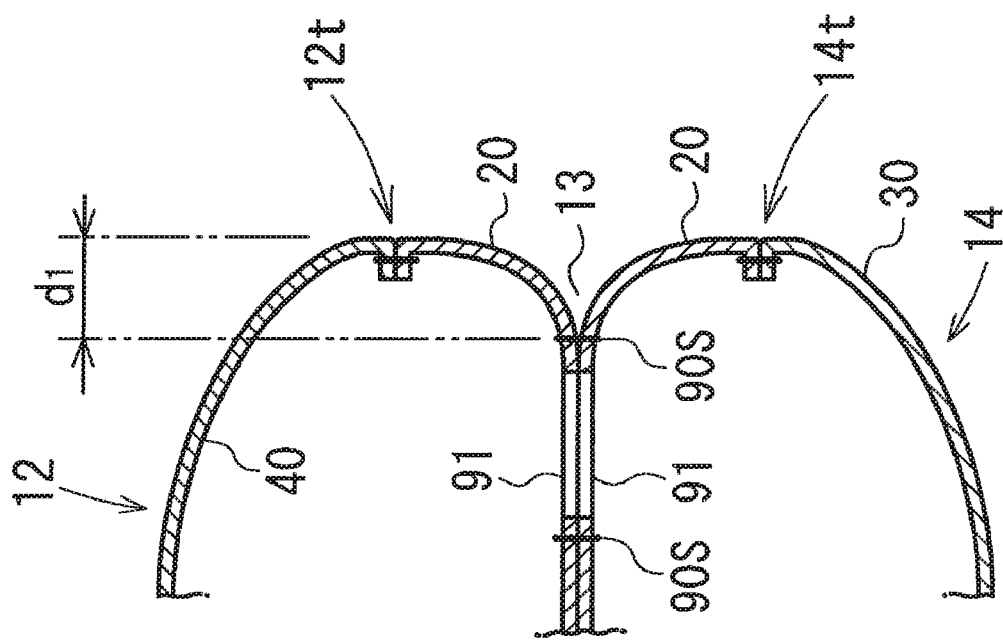
FIG. 4 is a cross-sectional view taken along line IV-IV in FIG. 3.
Figure 5:
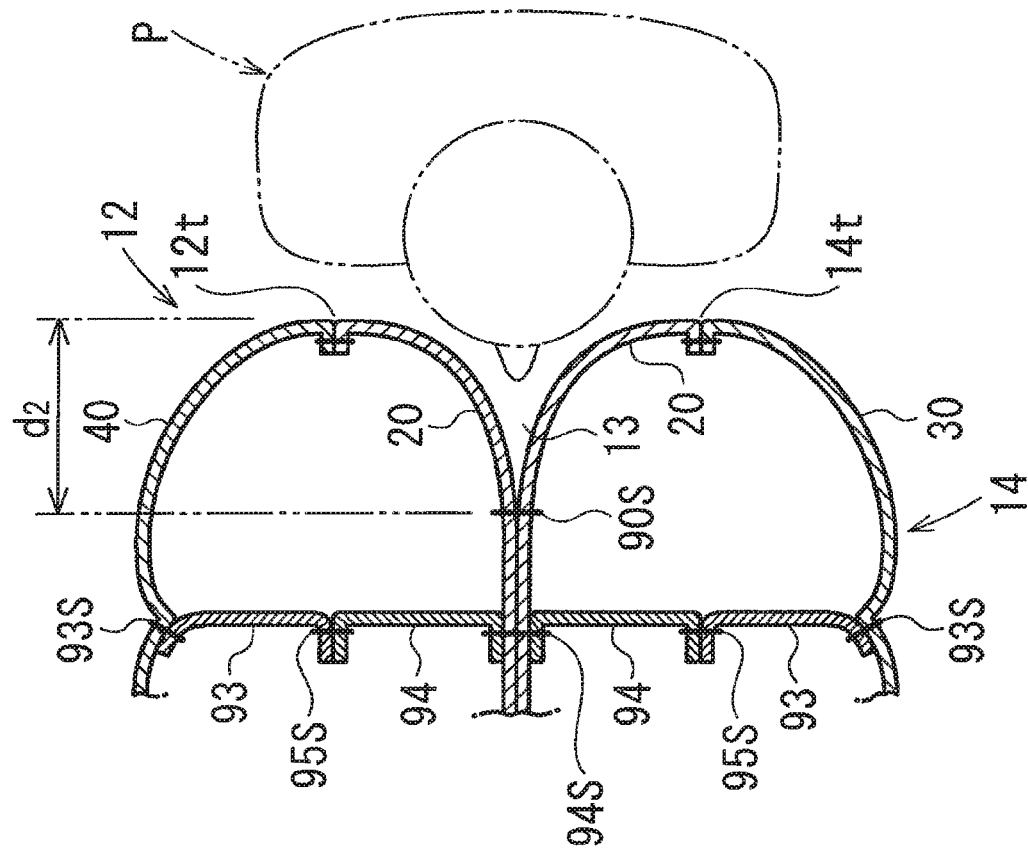
FIG. 5 is a cross-sectional view taken along line V-V in FIG. 3.
Figure 6:
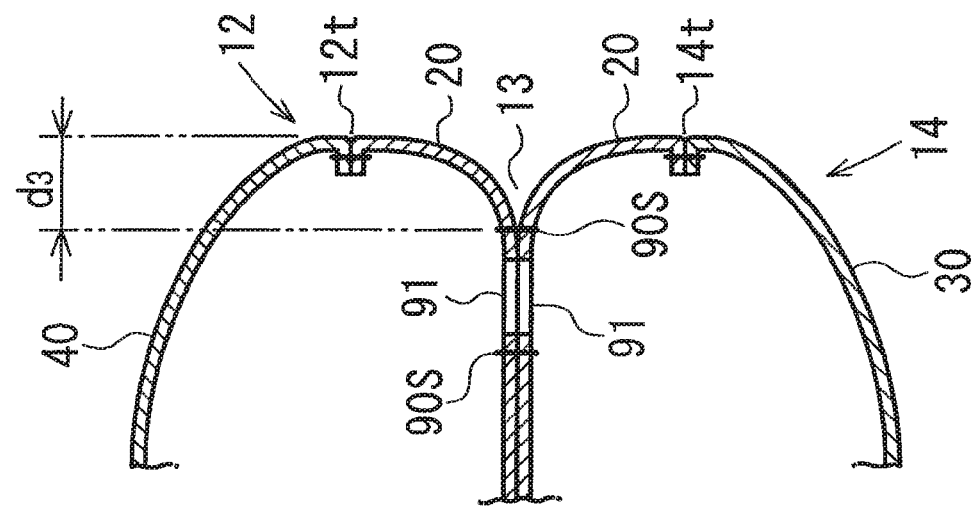
FIG. 6 is a cross-sectional view taken along line VI-VI in FIG. 3.
Figure 7:
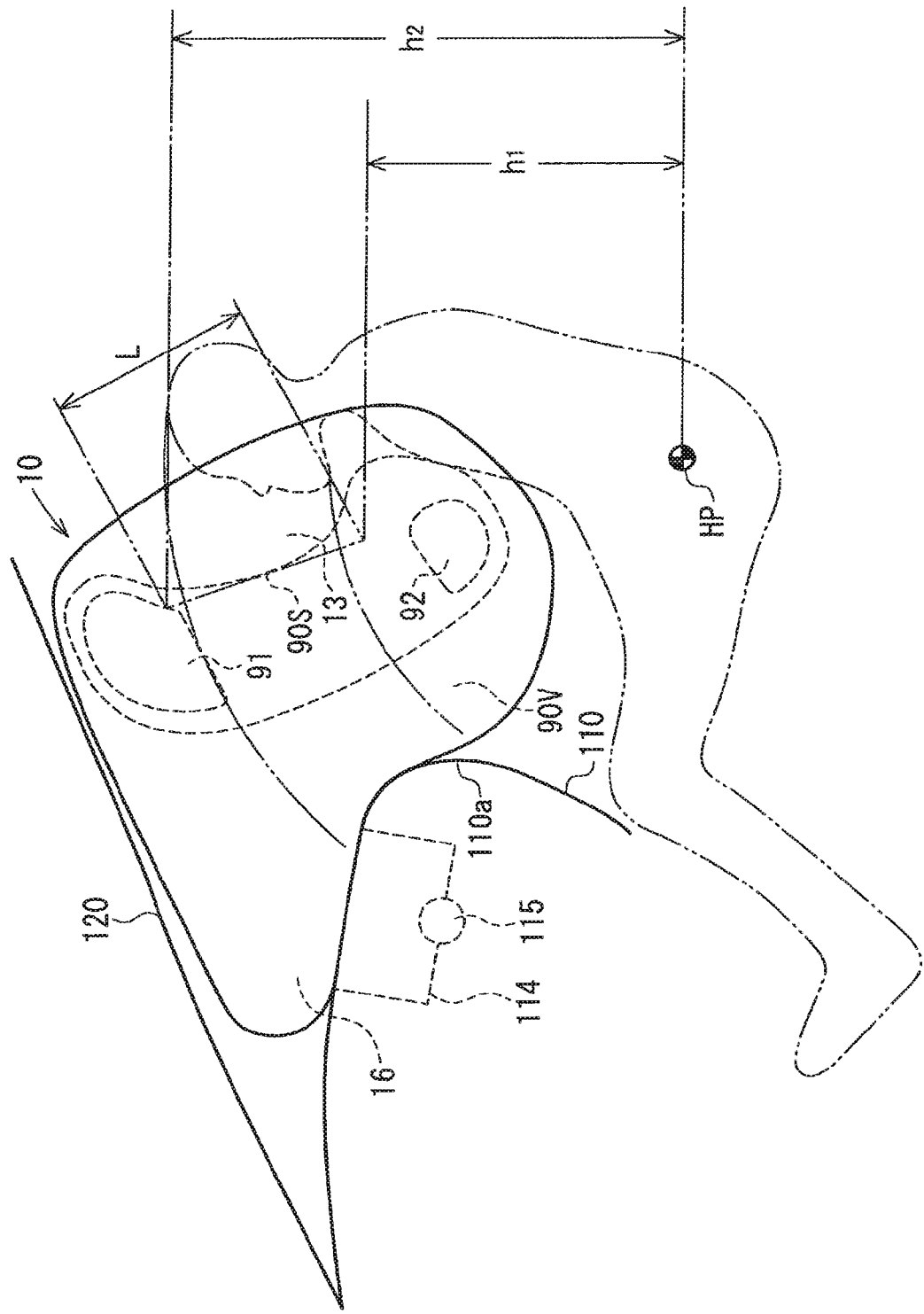
FIG. 7 is a side view of the airbag shown in FIG. 1.
Figure 8:
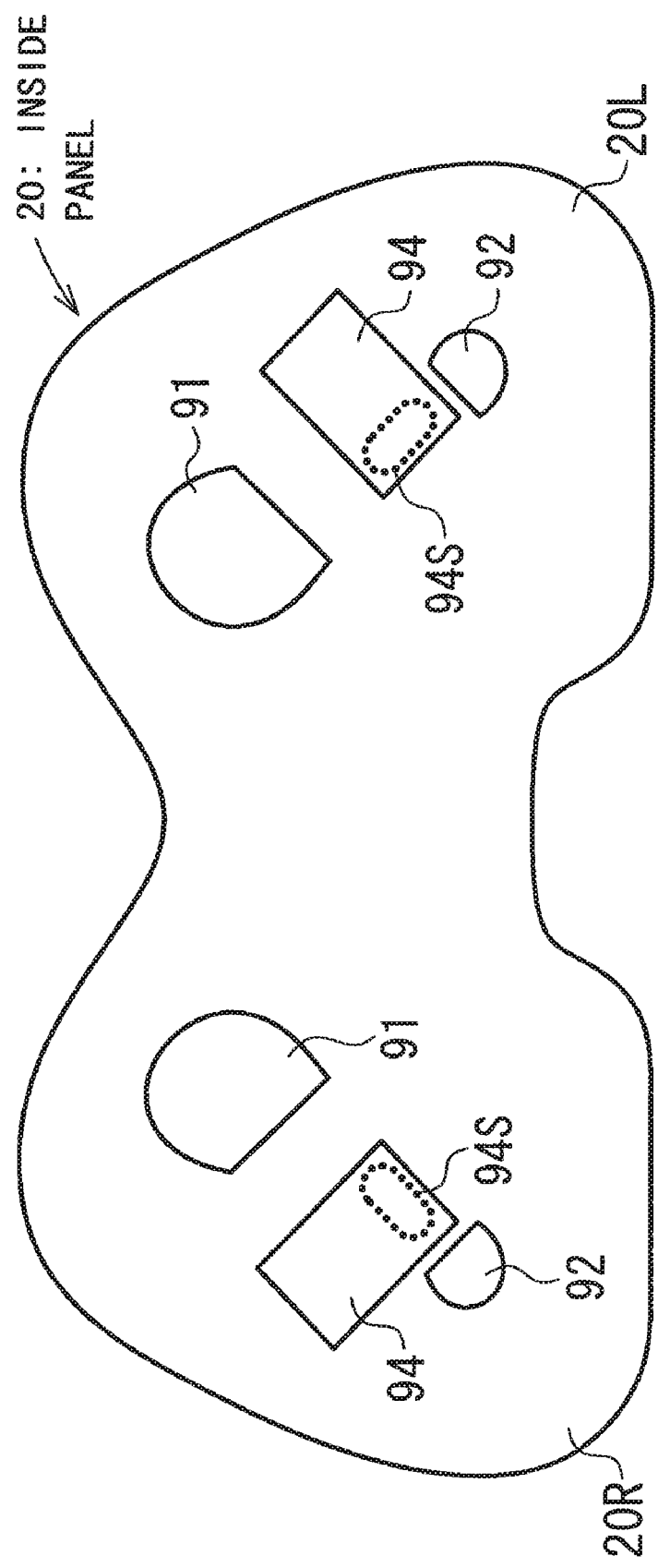
FIG. 8 is a plane view of the inside panel.
Figure 9:
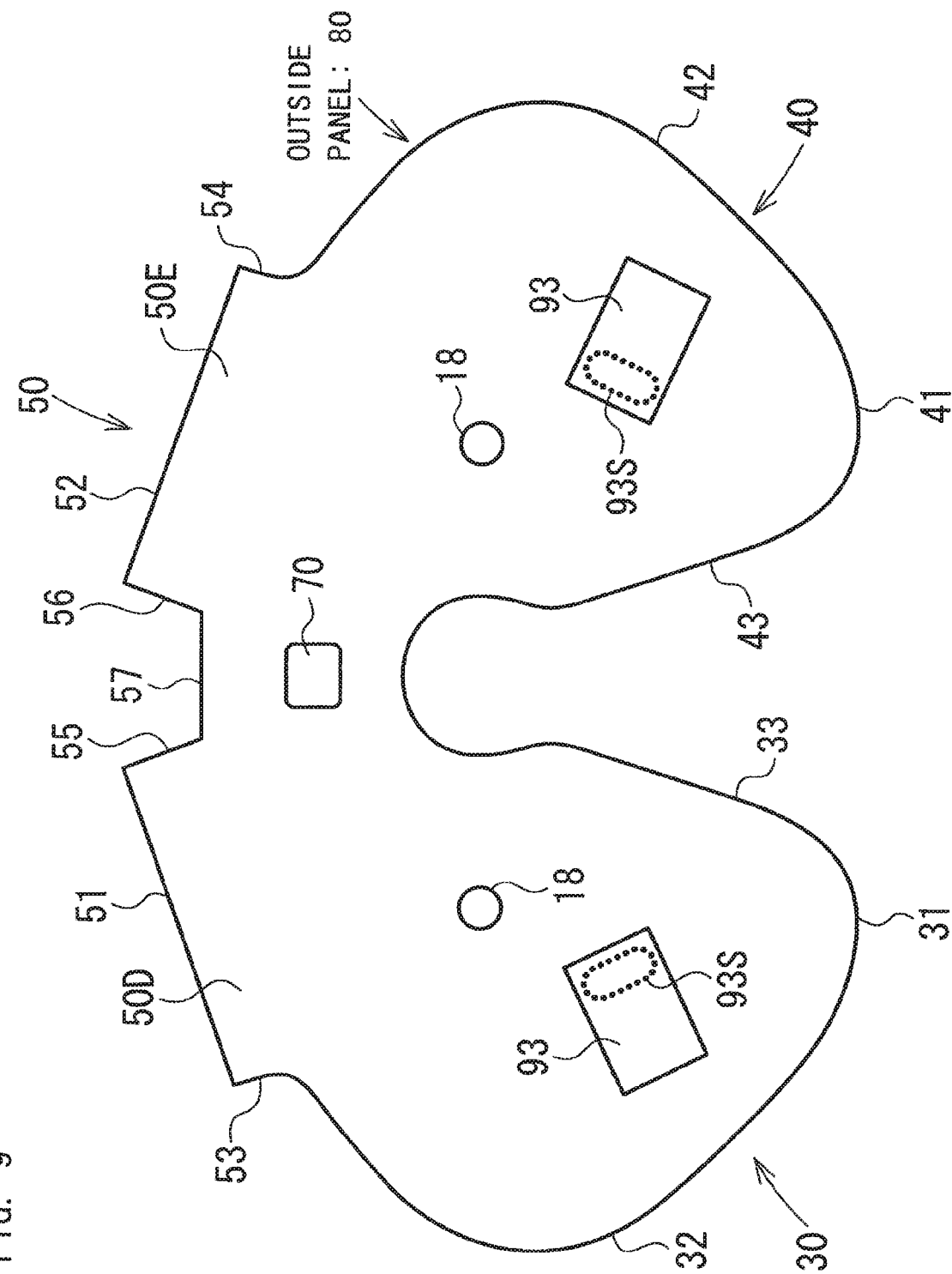
FIG. 9 is a plane view of the outside panel.
Figure 10:
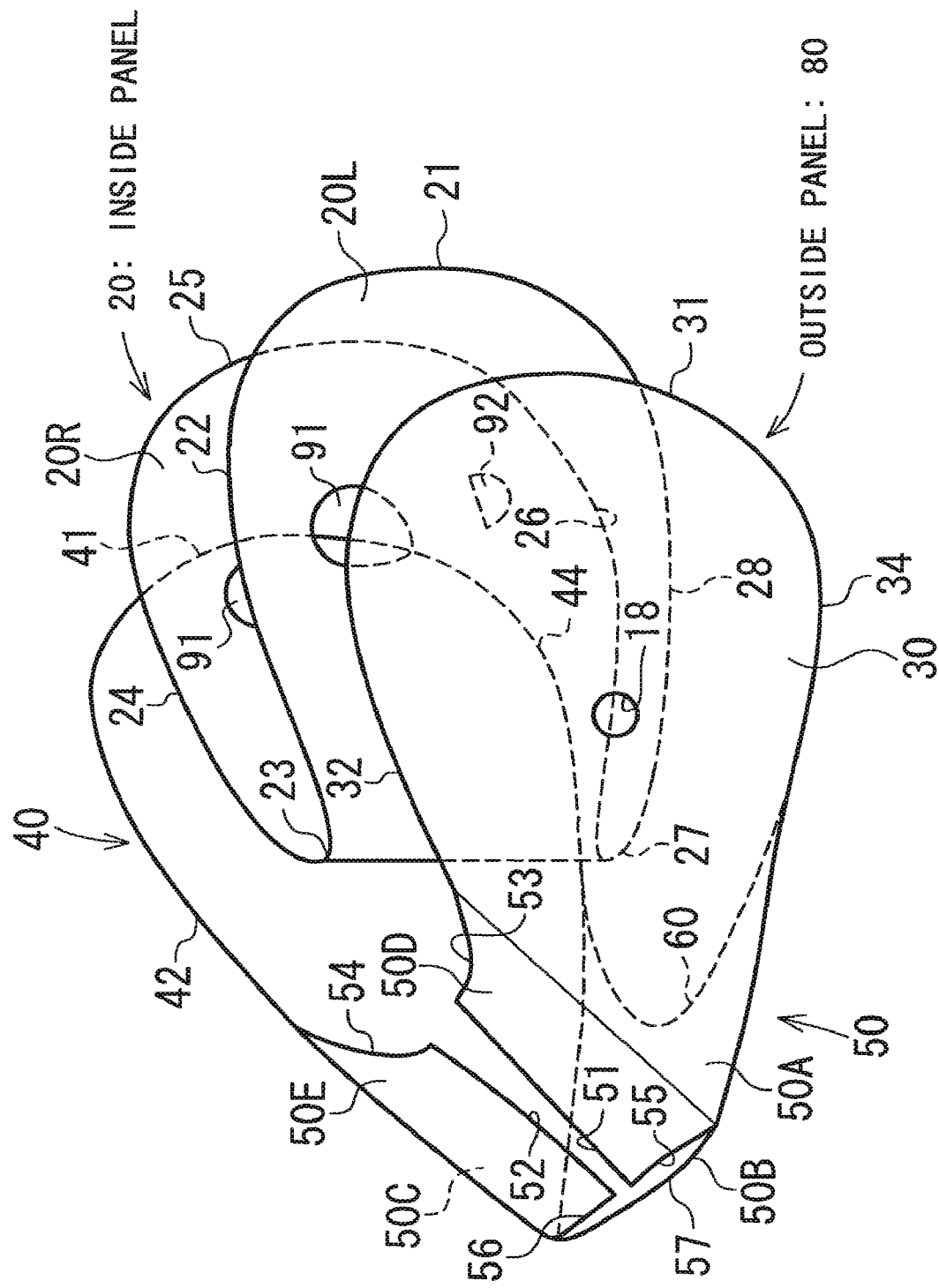
FIG. 10 is an exploded perspective view of the airbag shown in FIG. 1.

FIG. 1 is a perspective view of an airbag in an inflated state from above, according to an embodiment of the present invention. FIG. 2 is a horizontal cross-sectional view of this airbag. FIG. 3 is a cross-sectional view taken along line III-III in FIG. 2. FIGS. 4, 5, and 6 are cross-sectional views taken along lines IV-IV, V-V, and VI-VI in FIG. 3. FIG. 7 is a side view of the inflated airbag. FIG. 8 is a plane view of the inside panel. FIG. 9 is a plane view of the outside panel. FIG. 10 and FIG. 11 are exploded perspective views of this airbag.

An airbag 10 comprises a right half airbag 12 to be inflated on a right front side of an occupant, a left half airbag 14 to be inflated on a front left side of the occupant, and a base-end chamber 16 communicating with the base ends of the right half airbag 12 and the left half airbag 14. The face-to-face surfaces of the left half airbag 14 and the right half airbag 12 are stitched together by a seam 90S.

The right half airbag 12 and the left half airbag 14 communicate with each other via a first opening 91 and a second opening 92 provided on each of the above-described face-to-face surfaces. The first opening 91 is provided in the upper part of the airbag 10, and the second opening 92 is provided in the lower part of the airbag. The opening area of the opening 91 is preferably 7500 to 50000 mm², more preferably about 20000 to 40000 mm². The opening area of the opening 92 is preferably 1200 to 32000 mm², more preferably about 1900 to 20000 mm². The seam 90S extends around the openings 91 and 92.

When the airbag 10 is inflated, there is no bridge member such as a tie panel between the front ends of the right half airbag 12 and the left half airbag 14, and a vertically extending concave portion 13 is formed between the front ends of the right half airbag 12 and the left half airbag 14. This concave portion 13 opens toward the occupant (i.e., toward the right in FIG. 1 to FIG. 7). The inmost portion of the concave portion 13 is the above-described seam 90S.

When this airbag 10 is fully inflated, as shown in FIG. 2, a distance W between a front-most end 12t of the right half airbag 12 and a front-most end 14t of the left half airbag 14 is preferably 150 to 450 mm, more preferably 170 to 430 mm.

As shown in FIG. 3, the seam 90S curves so that it protrudes toward the vehicle rear side in the vicinity of the upper part of the concave portion 13 (on the rear edge side of the opening 91), then curves toward the vehicle front side in the vicinity of the intermediate part of the concave portion 13 (in the middle area between the opening 91 and the opening 92), and then curves so that it protrudes toward the vehicle rear side in the vicinity of the lower part of the concave portion 13 (the rear edge side of the opening 91). That is, in this embodiment, the seam 90S extends substantially vertically, with a portion curving away from the surfacing facing the occupant at the intermediate part of the concave portion 13. A tangential line T1 is tangent to both the convex curve of the seam 90S on the upper side of the concave portion 13, and the convex curve of the seam 90S on the lower side of the concave portion 13. That is, the tangential line T1 is tangent to the inmost parts of the upper and lower parts of the concave portion 13.

According to this embodiment, the seam 90S thus extends, making the concave portion 13 deepest in the vertical intermediate part and then gradually shallower upward and downward therefrom.

As shown in FIG. 4 to FIG. 6, with the airbag 10 fully inflated, the depth $d_1$ of the concave portion 13 from the front-most ends 12t and 14t of the right half airbag 12 and the left half airbag 14 in the upper part of the concave portion 13 is preferably 5 to 200 m, more preferably 30 to 170 mm. Similarly, with the airbag 10 fully inflated, the depth $d_2$ of the concave portion 13 from the front-most ends 12t and 14t in the intermediate part of the concave portion 13 is preferably 25 to 400 mm, more preferably 50 to 350 mm. Similarly, with the airbag 10 fully inflated, the depth $d_3$ of the concave portion 13 from the front-most ends 12t and 14t in the lower part of the concave portion 13 is preferably 5 to 200 mm, more preferably 30 to 170 mm.

Further, as shown in FIG. 3, the depth $d_4$ of the concave portion 13 from the tangential line T1 in the intermediate part of the concave portion 13 is preferably 0 to 200 m, more preferably 40 to 170 mm.

In the intermediate part of the concave portion 13, a range L in which the depth is 25 to 400 m (refer to FIG. 7) vertically extends preferably 150 to 400 mm, more preferably 200 to 300 mm. Note that the length L which indicates this range is the length along the surface facing the occupant. A height difference $h_1$ between the position of the lower end of this length L and a hip point HP of a small occupant dummy of the FMVSS AF05 percentile (the frame of a fifth percentile female American adult specified in the Federal Motor Vehicle Safety Standard of the US) is preferably 240 to 460 mm. Additionally, a height difference $h_2$ between the upper end of this range L and the above-described hip point HP is preferably 460 to 670 mm.

According to this embodiment, in the vertical intermediate part of the above range L, a direction T2 (refer to FIG. 3) of a tangent line within the vertical plane in the inmost part of the concave portion 13 is inclined toward the vehicle front. An inclination angle θ of this tangential direction T2 (i.e., the upward angle from the horizontal plane) is preferably 25 to 50°, more preferably about 30 to 45°.

Figure 25:
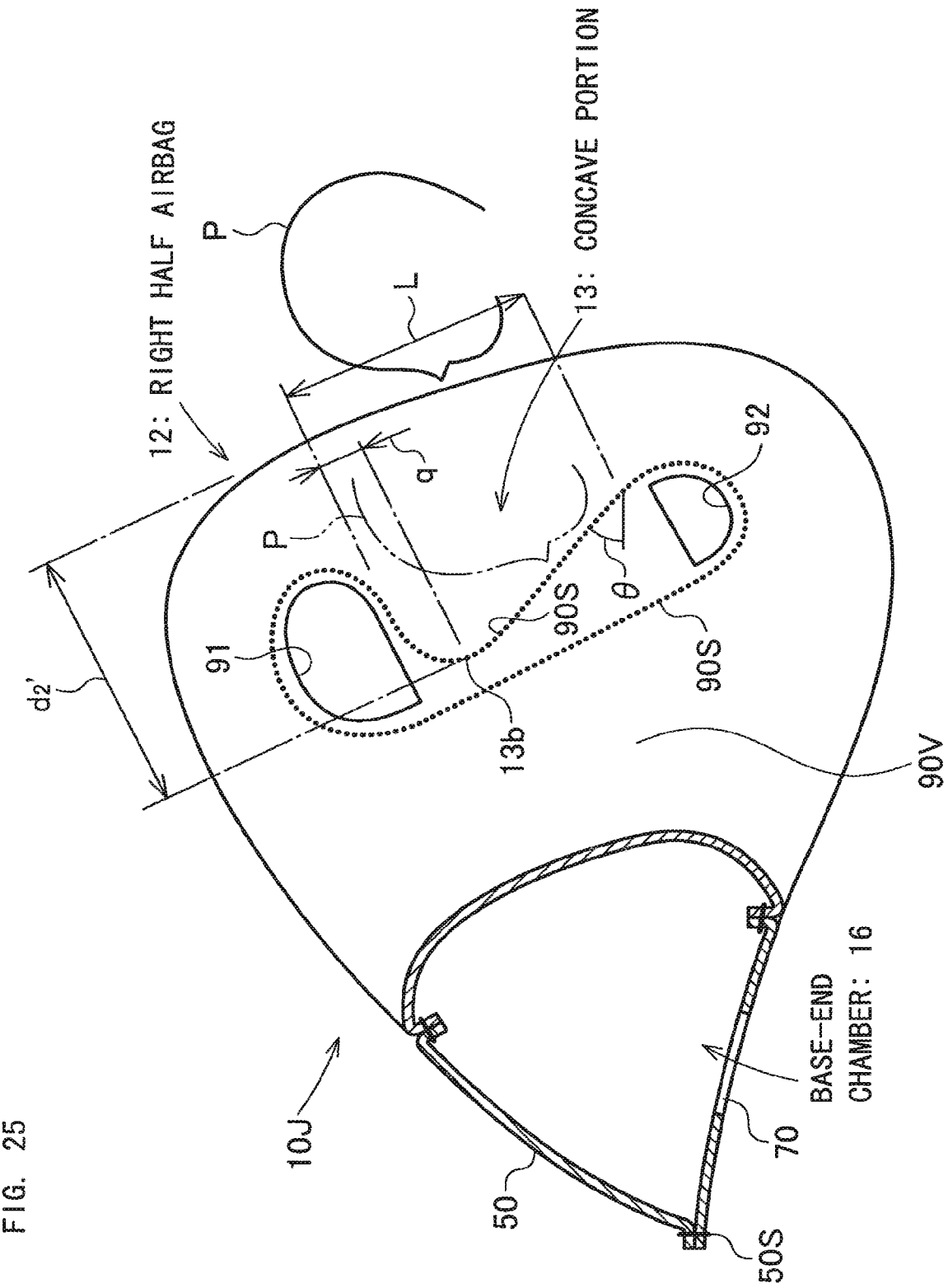
FIG. 25 is a vertical cross-sectional view in the front-back direction of the airbag in an inflated state according to an embodiment of the present invention.
Figure 27:
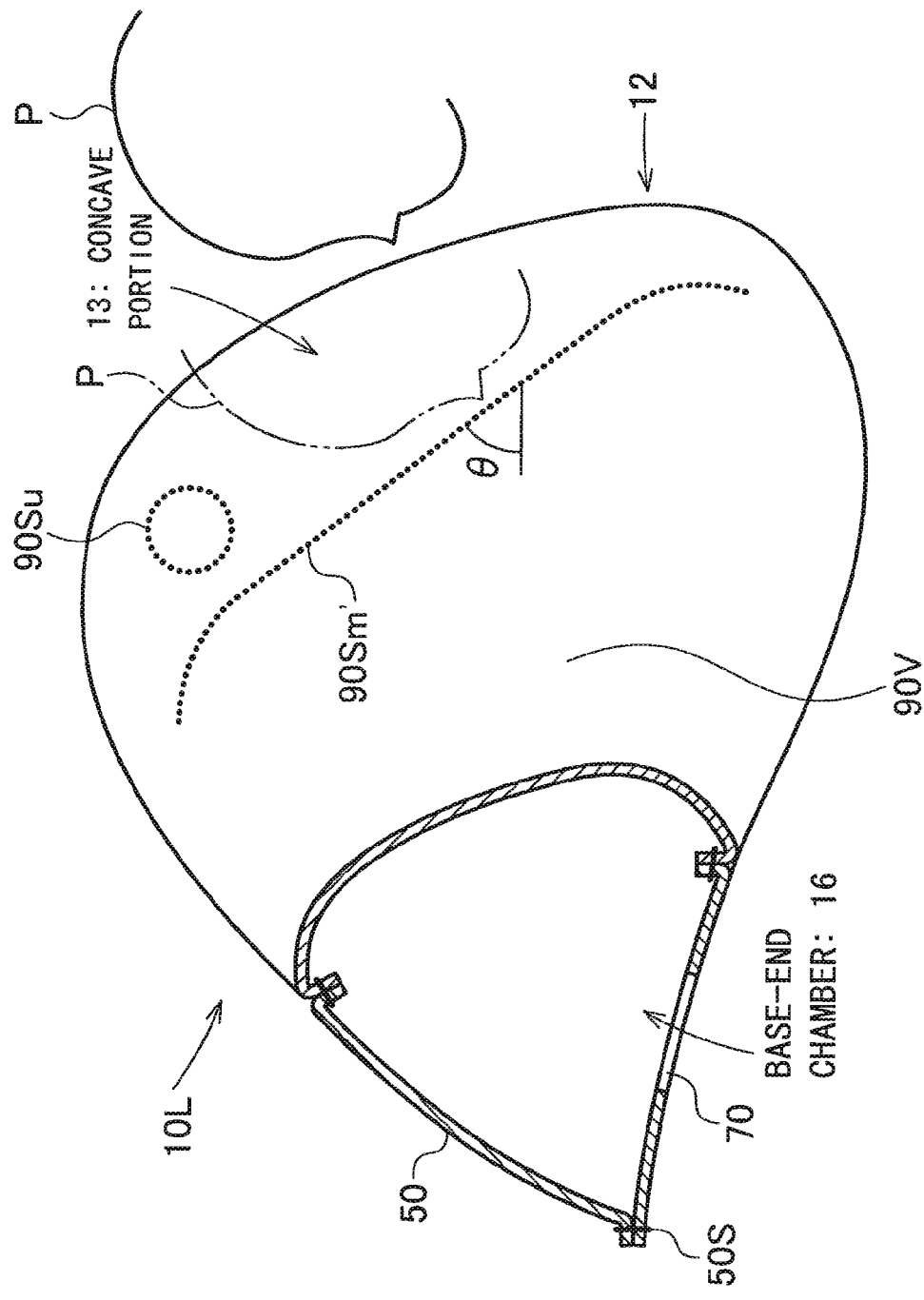
FIG. 27 is a vertical cross-sectional view in the front-back direction of the airbag in an inflated state according to an embodiment of the present invention.

Note that in FIGS. 3 and 7, the seam 90S curves from the vicinity of the upper end to the vicinity of the lower end of the range L, forming an overall convex, substantially arc shaped seam that protrudes toward the vehicle front. With this arrangement, the concave portion 13 is deepest in the vertical intermediate part, and gradually decreases in depth upward and downward from the intermediate part. Note that the shape of the seam 90S and the position of the deepest part of the concave portion 13 are not limited thereto. For example, the seam 90S may extend into a substantial "L" shape, a substantial "7" shape (FIGS. 3 and 5 show a substantial "7" shape flipped horizontally), or the like. Further, the concave portion 13 may form, for example, a shape that suddenly deepens on the lower side of the upper part of the concave portion 13 (that is, in the vicinity of the upper end of the range L), and gradually decreases in depth from that position toward the lower side, i.e., a shape in which the concave portion 13 deepens to the extent of the upper side in the intermediate part. The seam 90S does not need to be provided continuously across the upper part, intermediate part, and lower part of the concave portion 13. That is, for example, the seam 90S may be discontinuous between the upper part and intermediate part and/or between the intermediate part and lower part of the concave portion 13. Further, in the intermediate part of the concave portion 13, the seam 90S does not necessarily have to curve away from the surface facing the occupant. As long as the depth of the intermediate part of the concave portion 13 is deeper than the depths of the upper part and lower part of the concave portion 13, it is sufficient. That is, in the above intermediate part, the seam 90S may curve so that at least one portion comes close to the surface facing the occupant. Further, the seam 90S may extend linearly. One example of an airbag thus configured is shown in FIGS. 25 and 27, which will be described later in detail.

According to this embodiment, right-left tethers 93 and 94 that extend in the horizontal direction of the airbag 10 are provided near the vertical middle and the front-back middle of the right half airbag 12 and the left half airbag 14, respectively. These right-left tethers 93 and 94 restrict the lateral widths of the right half airbag 12 and the left half airbag 14 at the time of inflation. With this arrangement, the front end portions close to the occupant of each of the bags 12 and 14 further protrude in the direction of the occupant, further deepening the concave portion 13. Further, since the distance W between the front-most end 12t of the right half airbag 12 and the front-most end 14t of the left half airbag 14 is restricted, the ribs of the occupant are reliably restrained by these airbags 12 and 14, minimizing the load on the breastbones.

A vent hole 18 is provided on the outer surfaces of the right half airbag 12 and the left half airbag 14, i.e., on a right outer surface 40 and a left outer surface 30.

The panel configuration of this airbag 10 will now be described with reference to FIG. 8 to FIG. 11. FIG. 10 and FIG. 11 are exploded perspective views of each panel of the airbag 10.

The outer shell of the airbag 10 comprises an inside panel 20 and an outside panel 80.

The inside panel 20 is a substantially guitar-shaped long and narrow panel, which is folded at the center into a right side 20R and a left side 20L, as shown in FIGS. 10 and 11. The right side 20R forms an inner surface of the right half airbag 12, and the left side 20L forms an inner surface of the left half airbag 14. A periphery of the inside panel 20 is formed from the left side 20L having a lower side 28, a front-end side 21, an upper side 22, and an upper side 23 in the vicinity of a folded portion, and the right side 20R having an upper side 24, a front-end side 25, a lower side 26, and a lower side 27 in the vicinity of the folded portion.

As shown in FIG. 9 to FIG. 11, the outside panel 80 comprises the right outer surface 40 that forms an outer surface of the right half airbag 12, the left outer surface 30 that forms an outer surface of the left half airbag 14, and a mouth surface 50 that forms the base-end chamber 16.

The side edges of the outer periphery of the left outer surface 30 and the right outer surface 40 are formed by front-end sides 31 and 41, upper sides 32 and 42, and lower side 34 and 44.

The mouth surface 50 has a left-side surface 50A, a bottom 50B, a right-side surface 50C, a left flap 50D forming an upper left side, and a right flap 50E forming an upper right side. The base end of the left outer surface 30 continues to the left side surface 50A, and the base end of the right outer surface 40 continues to the right side surface 50C. The mouth surface 50 is folded to make the side surfaces 50A and 50C substantially triangular and is open to the front end of the airbag.

A periphery of the mouth surface 50 is formed from face-to-face sides 51 and 52 of the substantially rectangular flaps 50D and 50E, respective rear sides (flap rear sides) 53 and 54 of the flaps 50D and 50E, respective front sides 55 and 56 of the flaps 50D and 50E, a front side 57 facing the front sides 55 and 56, and a rear side (bottom rear side) 60 of the bottom 50B.

The above flap rear sides 53 and 54 are respectively connected to the upper sides 32 and 42 of the left outer surface 30 and the right outer surface 40. Both end sides of the bottom rear side 60 are respectively connected to the lower sides 34 and 44 of the left outer surface 30 and the right outer surface 40.

The opening 91 for communicating the interiors of the left half airbag 14 and the right half airbag 12 with each other is provided on each of the upper parts of the left side 20L and the right side 20R of the inside panel 20. Additionally, the opening 92 for communicating the interiors of the left half airbag 14 and the right half airbag 12 with each other is provided on each of the lower parts of the left side 20L and the right side 20R.

The base ends of the right-left tethers 94 are stitched together by a seam 94S between the openings 91 and 92 of the left side 20L, and between the openings 91 and 92 of the right side 20R.

The base ends of the right-left tethers 93 are stitched by a seam 93S at a position facing the right-left tether 94 of the outside panel 80.

Note that, in FIGS. 10 and 11, the right-left tethers 93 and 94 have been omitted for clarity of illustration.

A mouth 70, which is an opening for introducing gas from an inflator 115 (refer to FIG. 7), is provided in the lateral center part of the outside panel 80.

To manufacture this airbag 10, as shown in FIGS. 10 and 11, first the face-to-face sides 51 and 52 of the flaps 50D and 50E of the mouth surface 50 are stitched together. Reference numeral 51S of FIG. 11 denotes this stitched seam.

Next, the inside panel 20 is folded into two so that the left side 20L and the right side 20R thereof overlap. Subsequently, both sides 20L and 20R are stitched together by the seam 90S that wraps around the openings 91 and 92. Then, the left outer surface 30 of the outside panel 80 and the left side 20L of the inside panel 20 are faced. In this face-to-face state, the front-end sides 21 and 31, the upper sides 22 and 32, and the lower sides 28 and 34 are stitched together, respectively. Further, the right outer surface 40 of the outside panel 80 and the right side 20R of the inside panel 20 are faced, and the front-end sides 25 and 41, the upper sides 24 and 42, and the lower sides 26 and 44 are stitched together. The flap rear sides 53 and 54 of the mouth surface 50 of the outside panel 80 are stitched in the vicinity of the upper side 23 in the folded portion of the inside panel 20. The bottom rear side 60 of the mouth surface 50 and the lower side 27 in the folded portion are stitched together.

Subsequently, the front ends of the right-left tethers 93 and 94 are stitched together by a seam 95S (refer to FIGS. 2 and 5).

As a result of this stitching, the airbag 10 (refer to FIG. 1) is in a reversed state, i.e., a state in which the seam allowances are exposed on the surface of the airbag. As shown in FIG. 1, the flap front sides 55 and 56 of the mouth surface 50 and the front side 57 are not yet stitched together, and instead form an opening M in this state.

Then, the airbag is turned inside out through the opening M. This opening M is stitched by a seam 50S (refer to FIGS. 1 and 2) to form the airbag 10 of FIG. 1.

As shown in FIG. 2, the bottom 50B of the base-end chamber 16 has the opening (mouth) 70 for gas introduction from the inflator 115 (refer to FIG. 7).

The airbag 10 has an outer shell formed by the two panels 20 and 80, making stitching easy.

The airbag 10 is mounted to a front-passenger airbag device for restraining a front-passenger seat occupant of a vehicle in the event of a vehicle collision.

As shown in FIG. 7, the front-passenger seat airbag device comprises a case (container) 114 disposed on the top surface of an instrument panel 110, for housing the airbag 10, the inflator 115 for inflating the airbag 10, and the like. The inflator 115 is disposed in the case 114. The airbag 10 is housed in the case 114 in a folded condition. Then, a lid is mounted to the case to cover the folded airbag 10. The lid is torn and opened by a pressure from the airbag 10 when the airbag 10 is inflated. Reference numeral 120 of FIG. 7 denotes a windshield.

The operation of this airbag device will now be described.

When a vehicle equipped with this airbag device is involved in a collision, the inflator 115 is activated to eject gas. The gas from the inflator 115 first inflates the base-end chamber 16 and then flows into the right half airbag 12 and the left half airbag 14 to inflate them.

In the airbag 10, the base-end chamber 16 that was first inflated contacts the upper surface of the instrument panel 110 to become stable in position. As a result, the right half airbag 12 and the left half airbag 14 are stable in position not only after the inflation but also during the inflation.

The gas is supplied from the inflated base-end chamber 16 to the right half airbag 12 and the left half airbag 14 substantially equally. The front ends of the right half airbag 12 and the left half airbag 14 communicate with each other via the openings 91 and 92. Therefore, both the right half airbag 12 and the left half airbag 14 are inflated smoothly and substantially symmetrically from the early stage of inflation. When the openings 91 and 92 are not provided, for example, the inner pressure of the right half airbag 12 and the inner pressure of the left half airbag 14 become uneven, causing the inflation of the right half airbag 12 and the left half airbag 14 to be uneven. This may potentially lead to unstable deployment behavior of the airbag 10. Nevertheless, with the openings 91 and 92 provided as described above, uneven deployment of the right half airbag 12 and the left half airbag 14 is suppressed, thereby suppressing any sudden horizontal oscillation or neck swings during inflation.

When the airbag 10 is fully inflated, the vertically extended concave portion 13 is formed at the lateral center of the surface facing the occupant. That is, the vertically extended valley-shaped concave portion 13 is formed between the front ends of the right half airbag 12 and the left half airbag 14 to face the occupant.

According to this airbag 10, the right-left tethers 93 and 94 are provided as described above, resulting in a small lateral width when the right half airbag 12 and the left half airbag 14 are fully inflated. Further, when the airbag 10 is fully inflated, the area in the vicinity of the front-most ends 12t and 14t on the occupant's side of the right half airbag 12 and the left half airbag 14 protrudes toward the occupant. With this arrangement, the depths $d_1$ to $d_3$ of the concave portion 13 increase. This makes it possible to decrease the lateral width of the concave portion 13.

When the occupant plunges into the inflated airbag 10, the inflated right half airbag 12 receives the right side of the thorax and the inflated left half airbag 14 receives the left side of the thorax of an occupant P seated in the lateral center of the front-passenger seat, and the concave portion 13 faces the vicinity of the breastbones. Therefore, the reaction force applied near the breastbones during reception of the airbag decreases. The head portion enters and is received by the concave portion 13.

With this airbag 10, the depth $d_2$ of the vertical intermediate part of the concave portion 13 is deeper than the depth $d_1$ of the upper part and the depth $d_3$ of the lower part. When a small occupant of about the FMVSS AF05 percentile is seated in the front-passenger seat and a frontal collision occurs, the head portion of this small occupant is received by the concave portion 13 having a deep intermediate part. The left and right sides of the thorax and the shoulder vicinity of the occupant are received by the lower parts of the right half airbag 12 and the left half airbag 14 as described above. The mass of a small occupant is low. As a result, when a seatbelt is worn, the restraining force of the shoulder webbings of the seatbelt takes effect, resulting in a relatively low forward moving velocity of the thorax of the small occupant. The head portion of the small occupant moves forward at a relatively high velocity compared to the thorax. This head portion enters the vicinity of the intermediate part of the concave portion 13, and is sandwiched by the right half airbag 12 and the left half airbag 14 from both sides. As a result, the forward moving velocity of the head portion does not suddenly decrease, making it possible for the thorax and head portion to move forward and press into the airbag 10 while behaving in substantially the same manner. With this arrangement, the force applied to the neck of the small occupant is minimized.

Further, when the direction T2 of the tangent line of the inmost part of the concave portion 13 is inclined forward, the orientation of the face of the small occupant of about the AF05 percentile substantially matches the direction T2 of the tangent line upon reaching the inmost part. As a result, the load on the neck of the occupant is minimized.

When a large occupant of about the FMVSS AM50 percentile (an average frame of an American male adult) is seated in the front-passenger seat and a frontal collision occurs, the head portion of the occupant is received by the upper part of the surface of the airbag 10 facing the occupant. Additionally, the thorax and shoulders of the occupant are received by the vertical intermediate part of the airbag 10. The large occupant has high mass, and therefore moves forward with a greater amount of energy than the small occupant. In the upper part of the airbag 10, the concave portion 13 is shallow. As a result, when the head portion enters the concave portion 13, the left and right sides of the thorax and the shoulders come in contact with the right half airbag 12 and the left half airbag 14 at substantially the same time. Then, the head portion, thorax, and shoulders move forward while pressing into the airbag 10 as one. Since the concave portion 13 of the upper part of the airbag 10 is shallow, the front-back stroke of the airbag 10 required to restrain the head portion is maintained and, as a result, the impact applied to the large occupant is absorbed.

Figure 15:
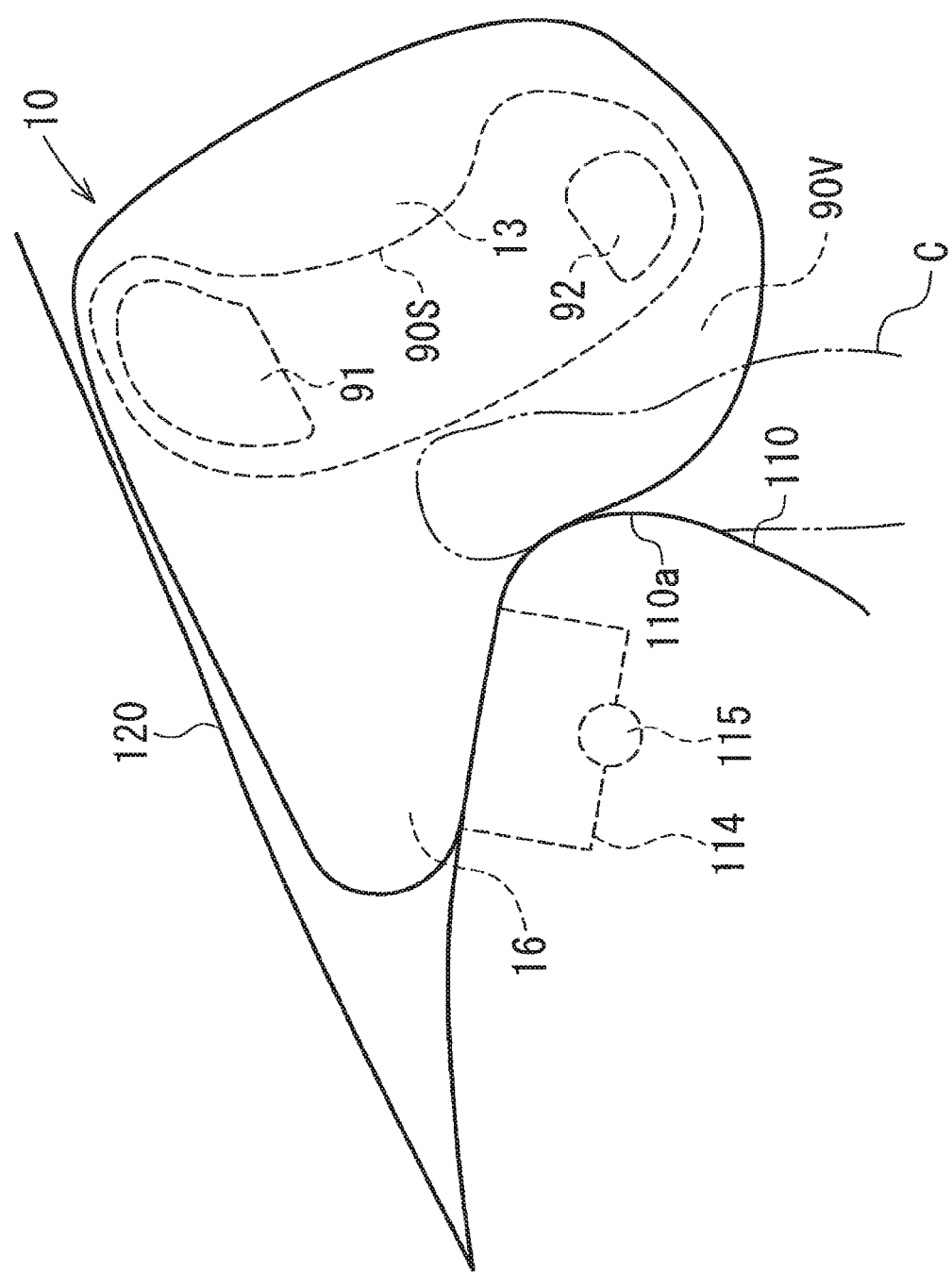
FIG. 15 is a side view of the airbag shown in FIG. 1 in an inflated state.

In this embodiment, as shown in FIG. 3, there exists a hollow portion 90V that passes vertically through the right half airbag 12 and the left half airbag 14 between the seam 90S and the base-end chamber 16. The hollow portion 90V is formed so that, when the airbag 10 is fully inflated, at least one portion of the lower end of the hollow portion 90V is positioned closer to the vehicle rear side than a rear end portion 110a of the instrument panel 110. That is, with the airbag 10 fully inflated, at least one portion of the opening on the lower end of the hollow portion 90V is exposed on the lower surface of the airbag 10, closer to the vehicle rear than the rear end portion 110a of the instrument panel 110. Therefore, as shown in FIG. 15, even if an object C is present in the vicinity of the instrument panel 110 when the airbag 10 inflates, the object C is engulfed by the hollow portion 90V.

While the right half airbag 12 and the left half airbag 14 have a plane-symmetrical shape in the above embodiment, a plane-asymmetrical shape is also acceptable. Further, the capacity of the right half airbag 12 and the capacity of the left half airbag 14 may be the same or different.

While the two openings 91 and 92 are provided in the airbag 10 of the above embodiment, one or three or more openings may be provided. Further, the openings may be omitted. Additionally, the size of the openings may be a size other than described above.

Another embodiment will now be described with reference to FIG. 16 to FIG. 27.

Figure 16:
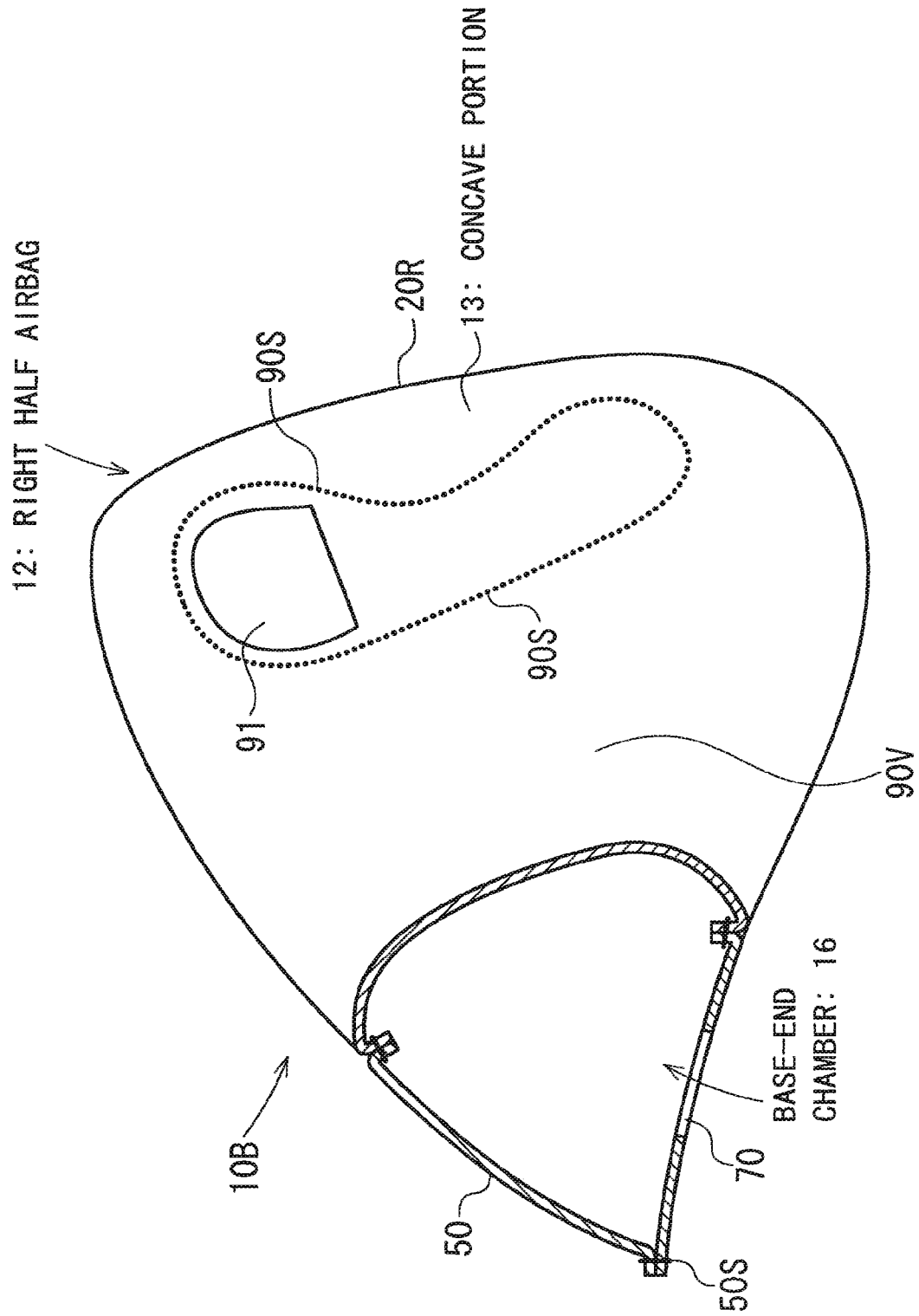
FIG. 16 is a vertical cross-sectional view in the front-back direction of the airbag in an inflated state according to an embodiment of the present invention.

FIG. 16 is a vertical cross-sectional view of the same part as FIG. 3 of the airbag 10B according to an embodiment wherein the lower part opening 92 is omitted and only the upper part opening 91 is provided.

Figure 17:
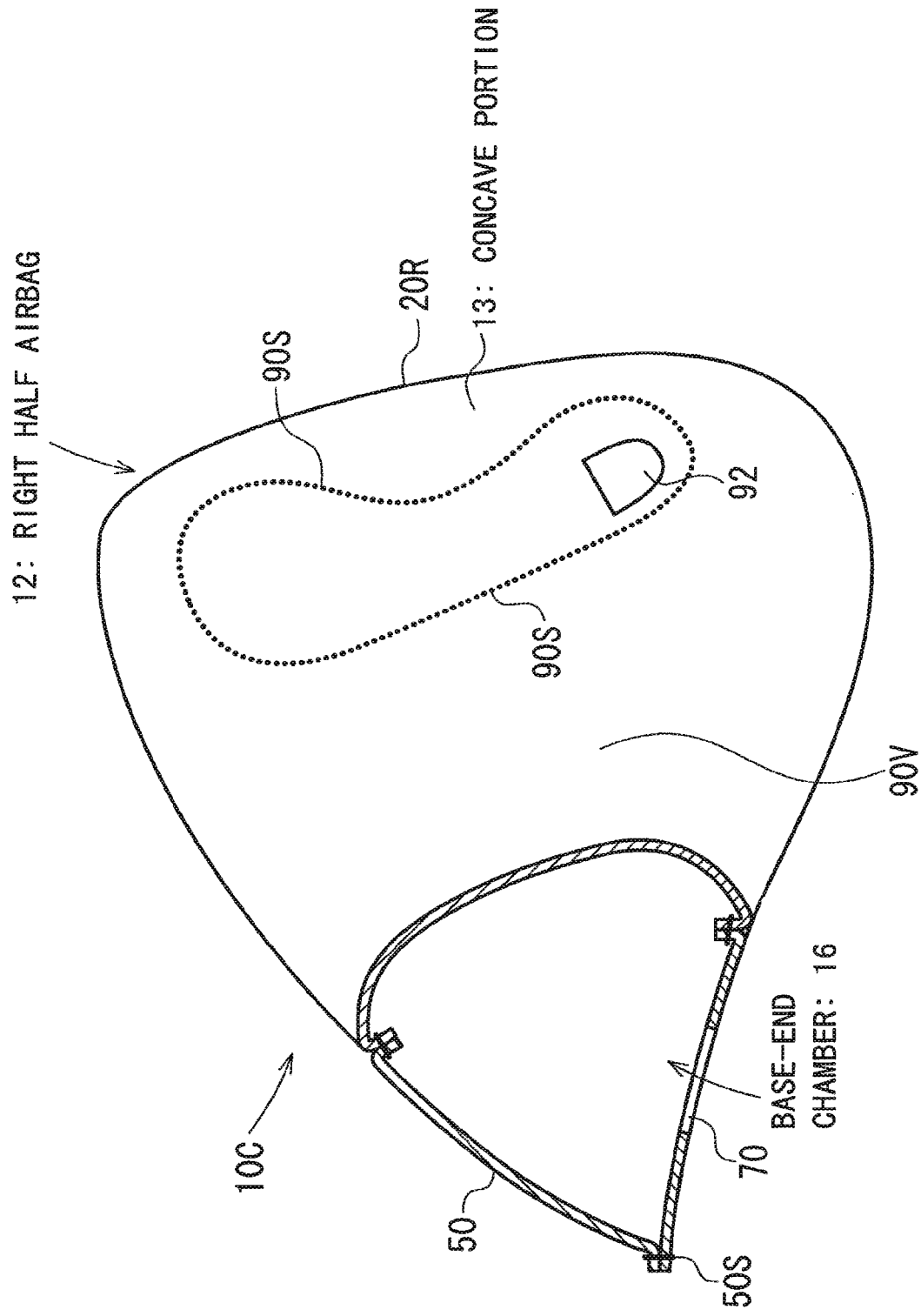
FIG. 17 is a vertical cross-sectional view in the front-back direction of the airbag in an inflated state according to an embodiment of the present invention.

FIG. 17 is a vertical cross-sectional view of the same part as FIG. 3 of the airbag 10C according to an embodiment wherein the upper part opening 91 is omitted and only the lower part opening 92 is provided.

Figure 18:
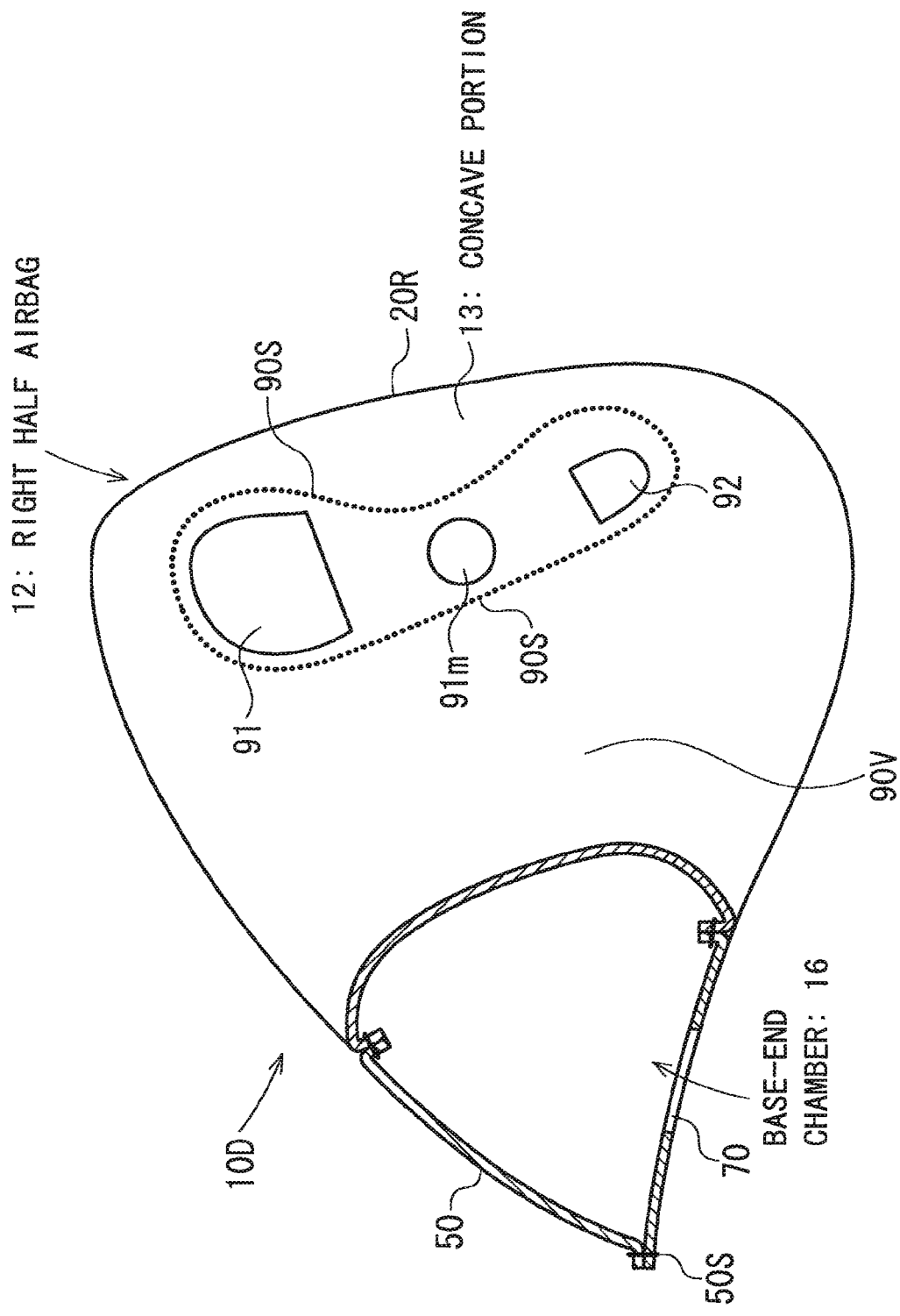
FIG. 18 is a vertical cross-sectional view in the front-back direction of the airbag in an inflated state according to an embodiment of the present invention.

FIG. 18 is a vertical cross-sectional view of the same part as FIG. 3 of an airbag 10D according to an embodiment wherein a intermediate part opening 91m is provided between the upper part opening 91 and the lower part opening 92.

Figure 19:
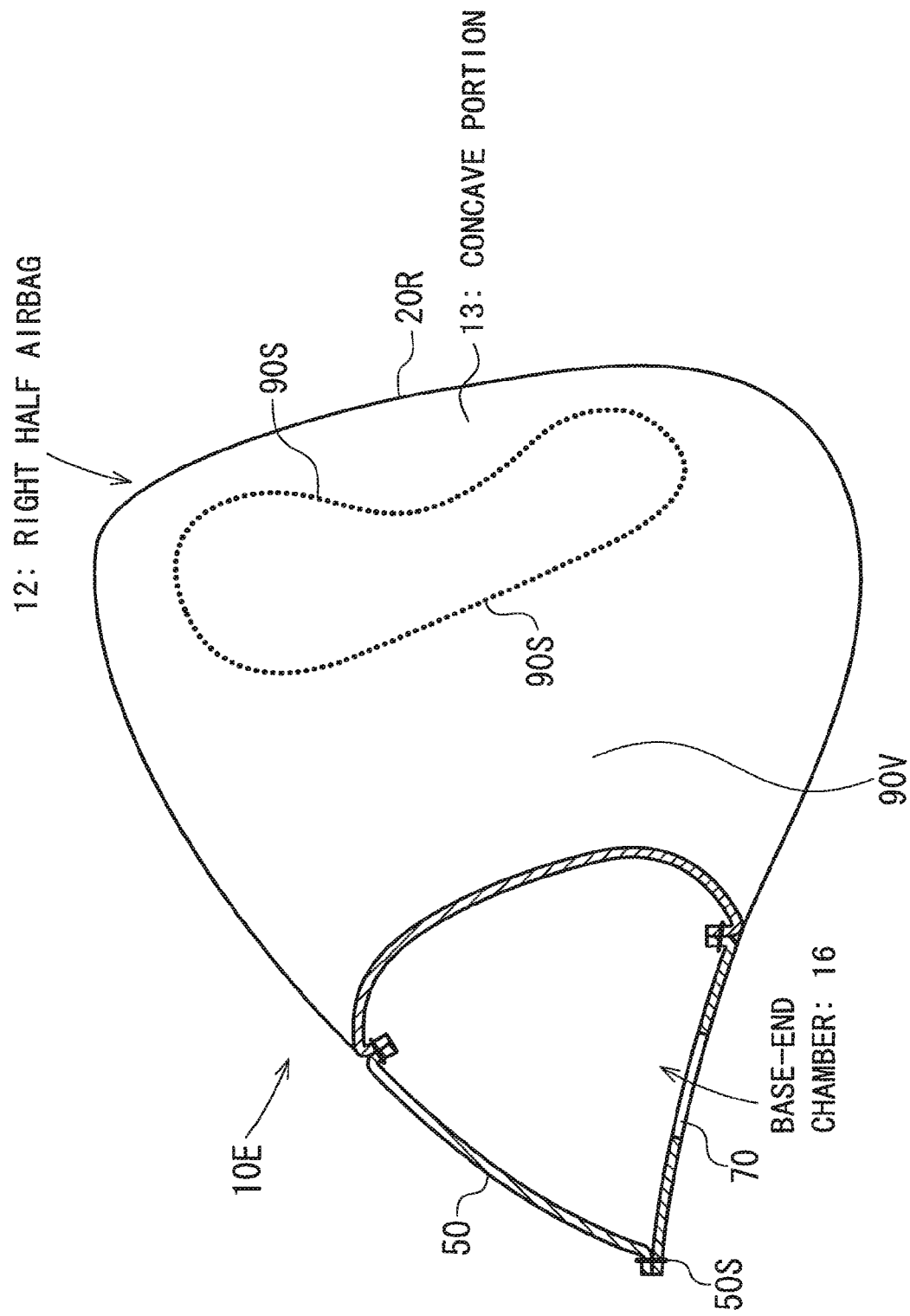
FIG. 19 is a vertical cross-sectional view in the front-back direction of the airbag in an inflated state according to an embodiment of the present invention.

FIG. 19 is a vertical cross-sectional view of the same part as FIG. 3 of an airbag 10E according to an embodiment wherein the upper part and lower part openings 91 and 92 are omitted.

Other arrangements in FIG. 16 to FIG. 19 are identical to those in FIG. 3, and the identical reference numerals denote the same components.

Figure 20:
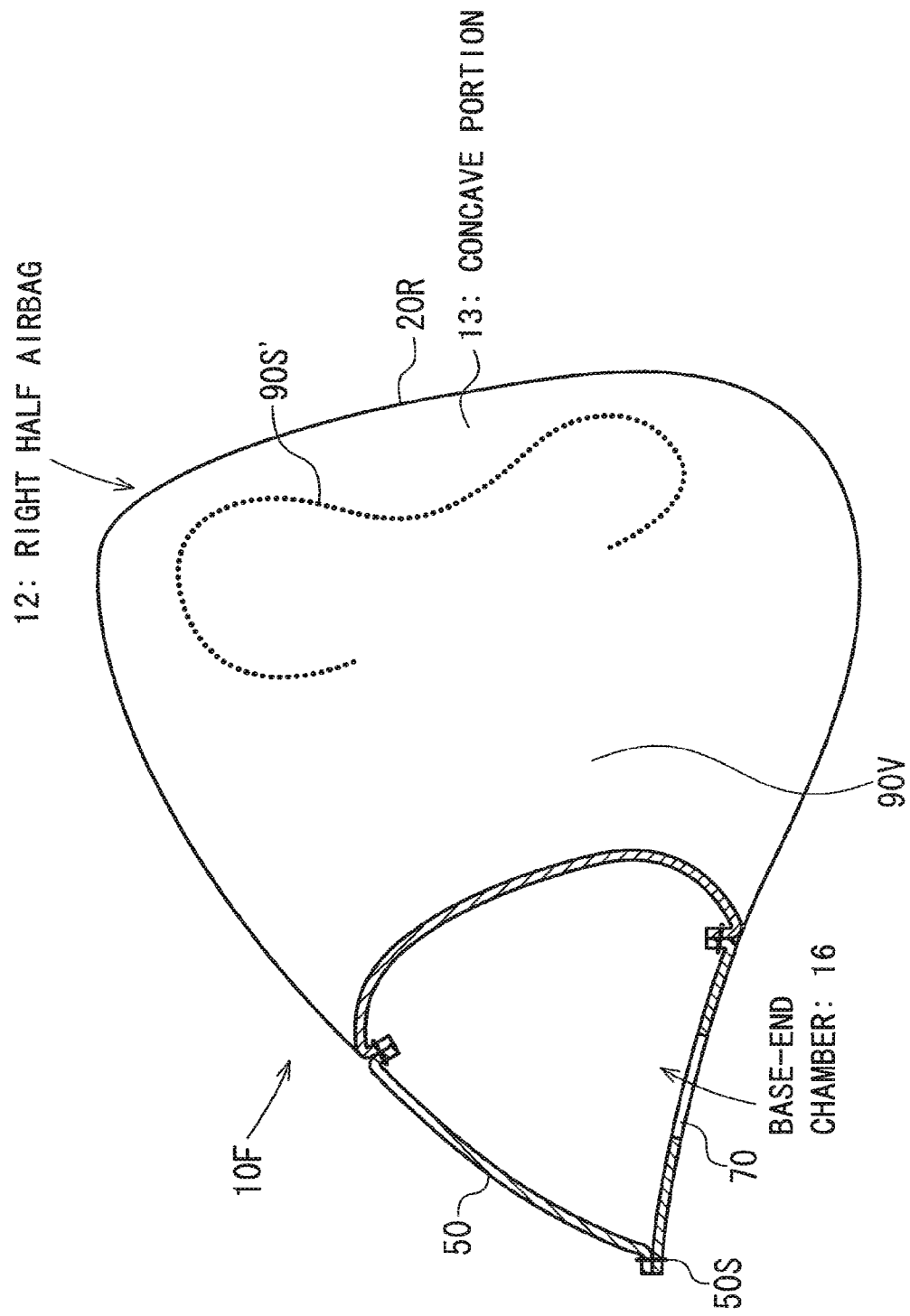
FIG. 20 is a vertical cross-sectional view in the front-back direction of the airbag in an inflated state according to an embodiment of the present invention.
Figure 21:
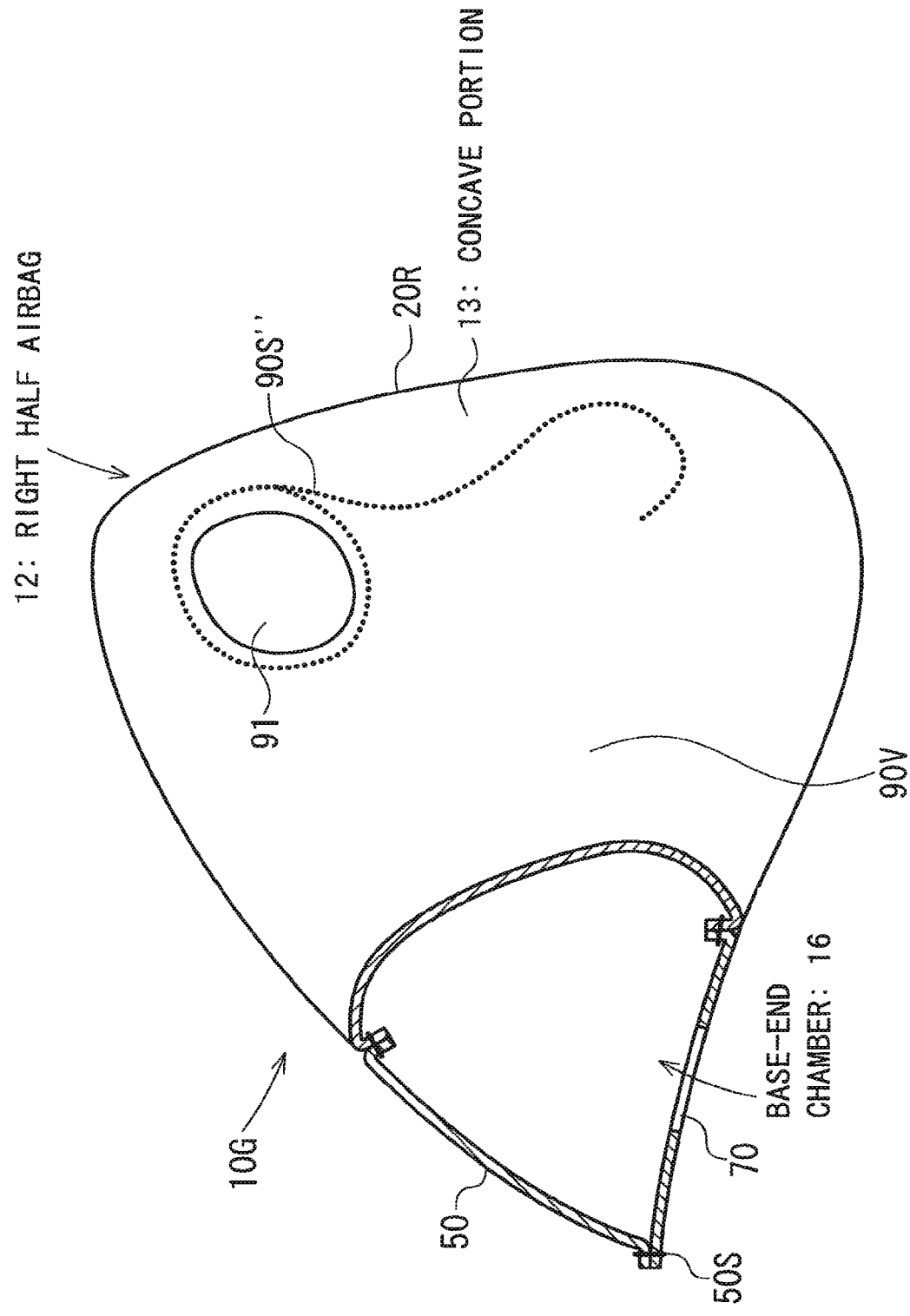
FIG. 21 is a vertical cross-sectional view in the front-back direction of the airbag in an inflated state according to an embodiment of the present invention.

According to the present invention, the seam 90S may be interrupted rather than a closed loop. FIG. 20 and FIG. 21 are vertical cross-sectional views of the same part as FIG. 3 of an airbag according to such an embodiment.

According to an airbag 10F of FIG. 20, the part of a seam 90S' that extends vertically on the vehicle front side is partially omitted. In this airbag 10F, similar to the airbag 10E, both the openings 91 and 92 are omitted. All other arrangements are the same as those in FIG. 3, and the identical reference numerals denote the same components.

In an airbag 10G of FIG. 21, the upper part opening 91 is provided. A seam 90S" extends on the upper side of the seam 90S' of FIG. 20, and wraps around the periphery of the opening 91. All other arrangements are the same as those in FIG. 20, and the identical reference numerals denote the same components.

According to the present invention, on the inner side of the intermediate part of the concave portion 13, the right half airbag 12 and the left half airbag 14 may be configured to be pressed together when the airbag is in an inflated state.

Figure 22:
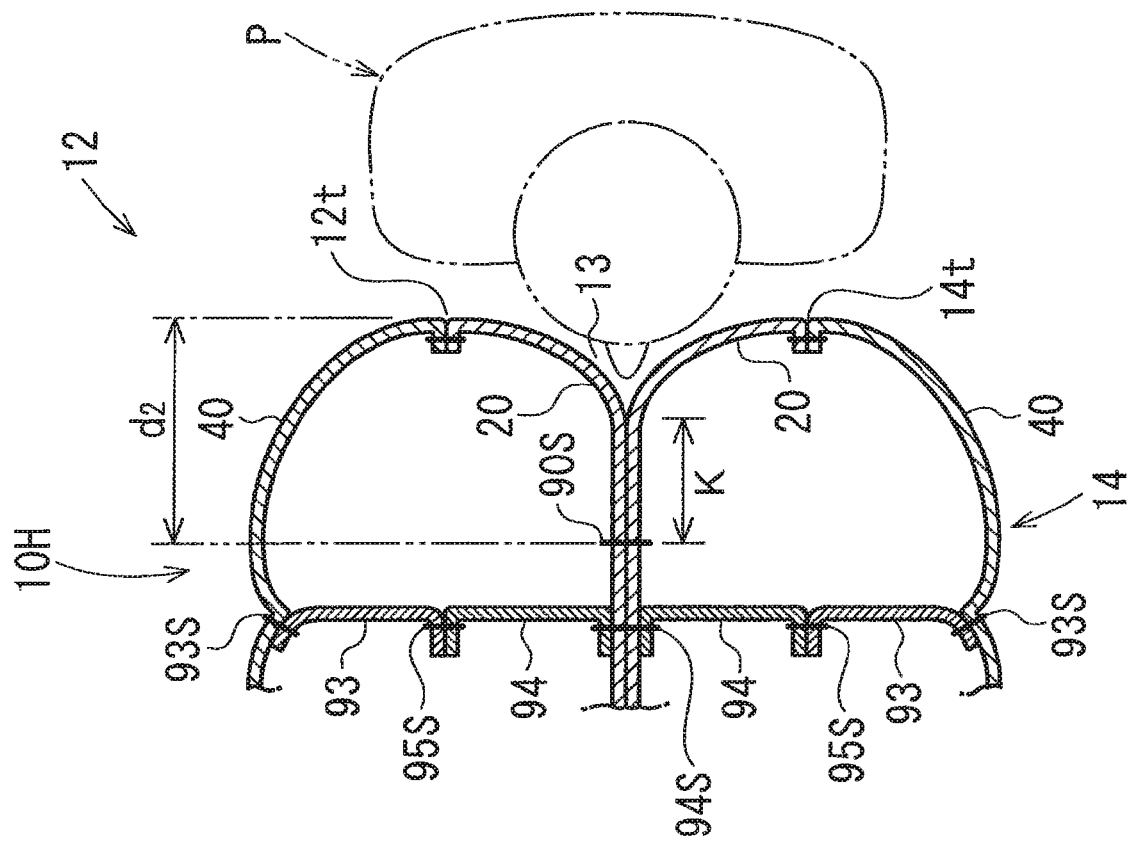
FIG. 22 is a cross-sectional view in the horizontal direction of the airbag in an inflated state according to an embodiment of the present invention.

FIG. 22 is a cross-sectional view in the substantially horizontal direction of the occupant's side an inflated airbag 10H of such an embodiment, showing a cross-section of the same part as in FIG. 5.

According to this embodiment, the part of the seam 90S closer to the occupant is positioned slightly further inward (toward the vehicle front side) in the intermediate part of the concave portion 13 than that shown in FIG. 5. In an inner region K of the intermediate part of the concave portion 13 on the side closer to the occupant than the seam 90S, the inflated right half airbag 12 and left half airbag 14 are pressed together. The head portion of the occupant P enters the inner region K when a frontal collision occurs, and moves forward while pressing apart the right half airbag 12 and the left half airbag 14, causing the impact to be absorbed therebetween.

Figure 23:
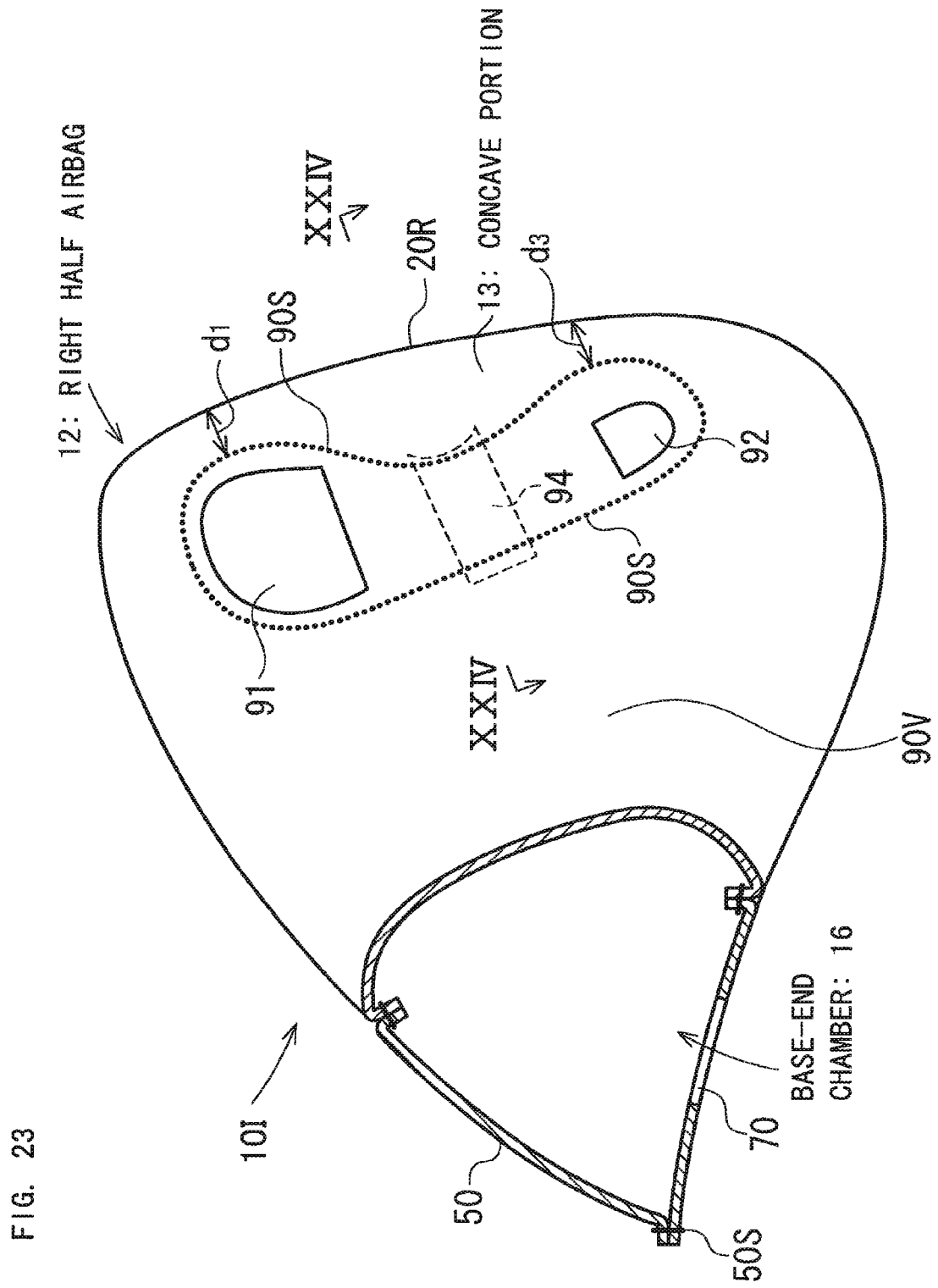
FIG. 23 is a vertical cross-sectional view in the front-back direction of the airbag in an inflated state according to an embodiment of the present invention.
Figure 24:
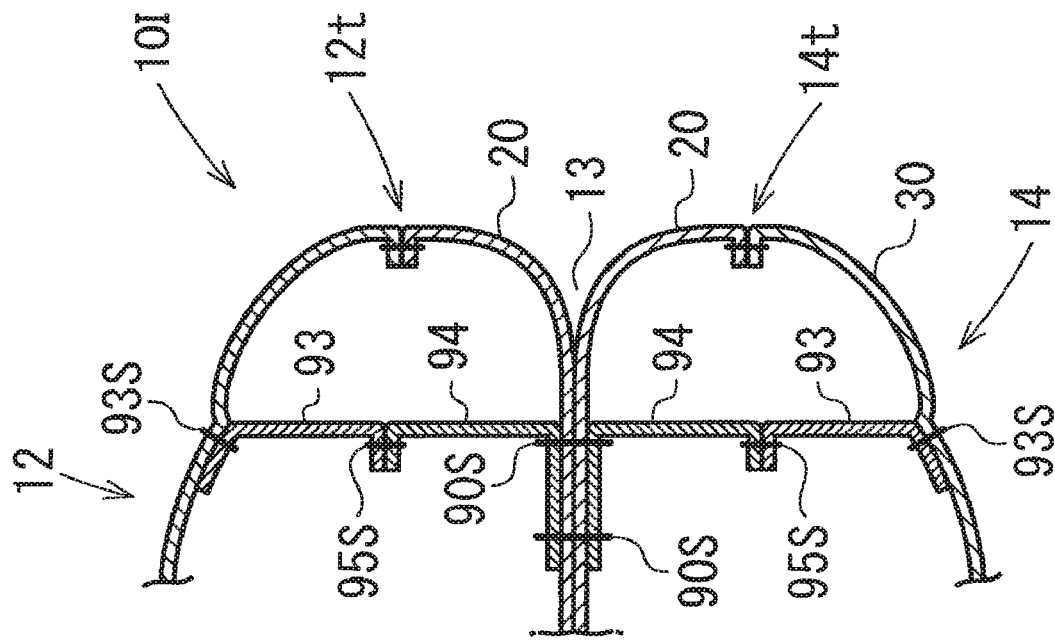
FIG. 24 is a cross-sectional view taken along line XXIV-XXIV in FIG. 23.

According to the present invention, a right-left tether may be stitched to the right half airbag 12 and the left half airbag 14 by the seam 90S. FIG. 23 is a vertical cross-sectional view of the same part as FIG. 3 of such an airbag 10I. FIG. 24 is a cross-sectional view taken along line XXIV-XXIV of FIG. 23. In this airbag 10I, the right-left tether 94 is stitched to the inside panel 20 by the seam 90S. With the right-left tether 94 thus stitched by the seam 90S, the seam 94S may be omitted.

According to the present invention, the right-left tethers 93 and 94 are preferably made of coated fabric, similar to the inside panel 20 and the outside panel 80. This coated fabric, for example, is made of a base cloth formed by a woven fabric of synthetic fiber such as nylon, and coated with a silicon resin or the like on one surface.

When the right-left tethers 93 and 94 are formed using such a coated fabric, the resin coated surfaces of the right-left tethers 93 and 94 preferably face the vehicle front. With this arrangement, even in a case where the hot gas from the inflator comes in contact with the right-left tethers 93 and 94, the heat resistance of the right-left tethers 93 and 94 is increased.

According to the embodiment of the above FIG. 1 to FIG. 15, etc., the openings 91 and 92 are independent and provided separately from each other. Nevertheless, as in inside panels 20A, 20B, and 20C of FIG. 12 to FIG. 14, the opening 94 having a long narrow shape that connects the openings 91 and 92 may be provided with a front-back tether made of a small panel that crosses the opening 94.

Figure 12A:
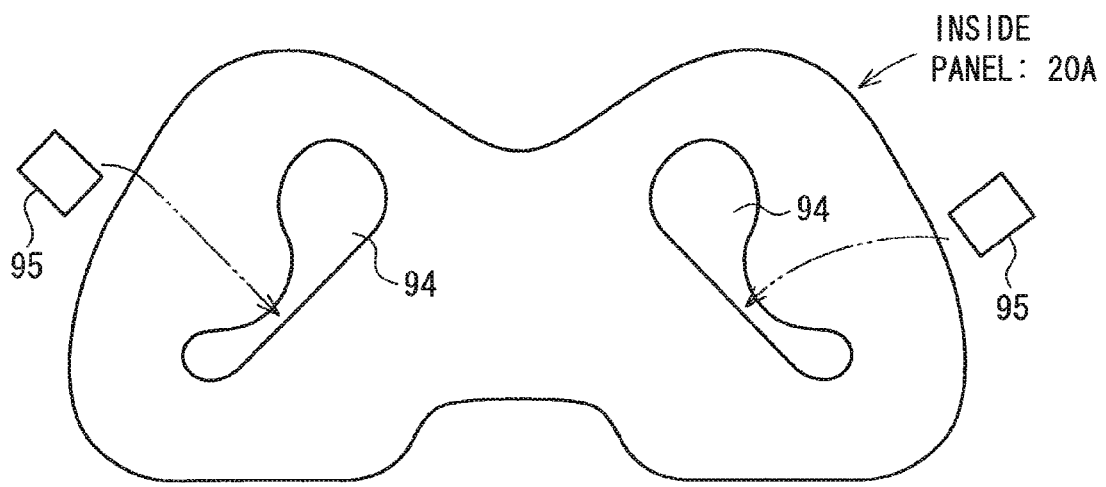
FIG. 12 is a schematic view of the inside panel.
Figure 12B:
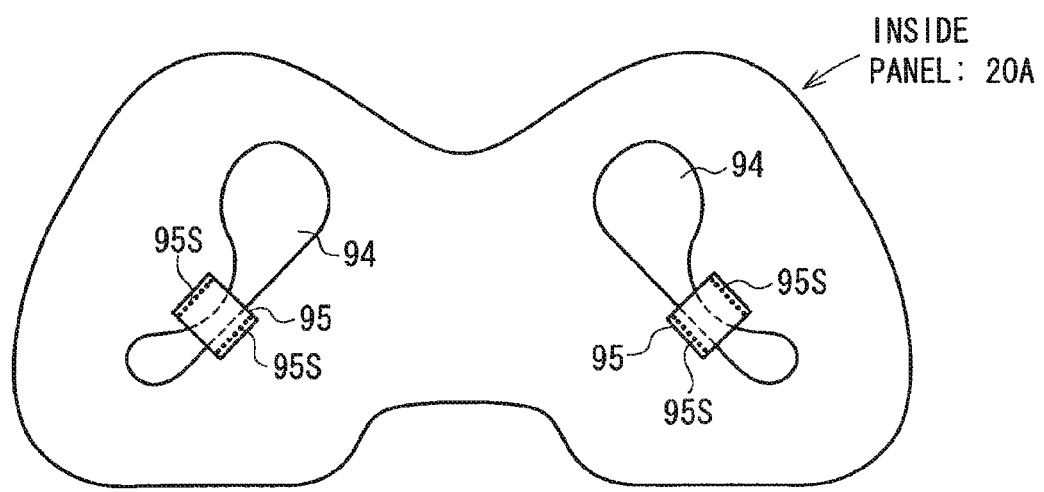

The opening 94 of the inside panel 20A of FIGS. 12A and 12B has a guitar shape with a narrow middle. A front-back tether 95 made of a small panel crosses over the narrow portion of the opening 94. Further, the front-back tether 95, as shown in FIG. 12B, is stitched together with the edges on the vehicle front and rear sides of the opening 94, respectively, by the seam 95S.

Figure 13A:
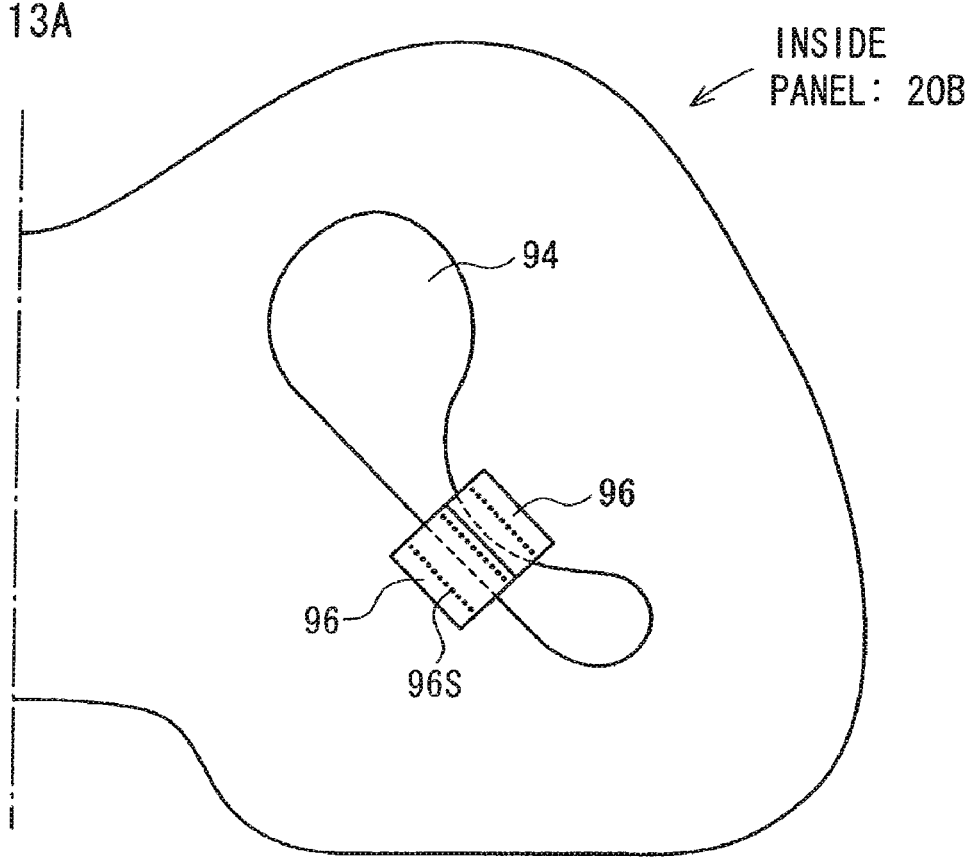
FIG. 13 is a schematic view of the inside panel.
Figure 13B:
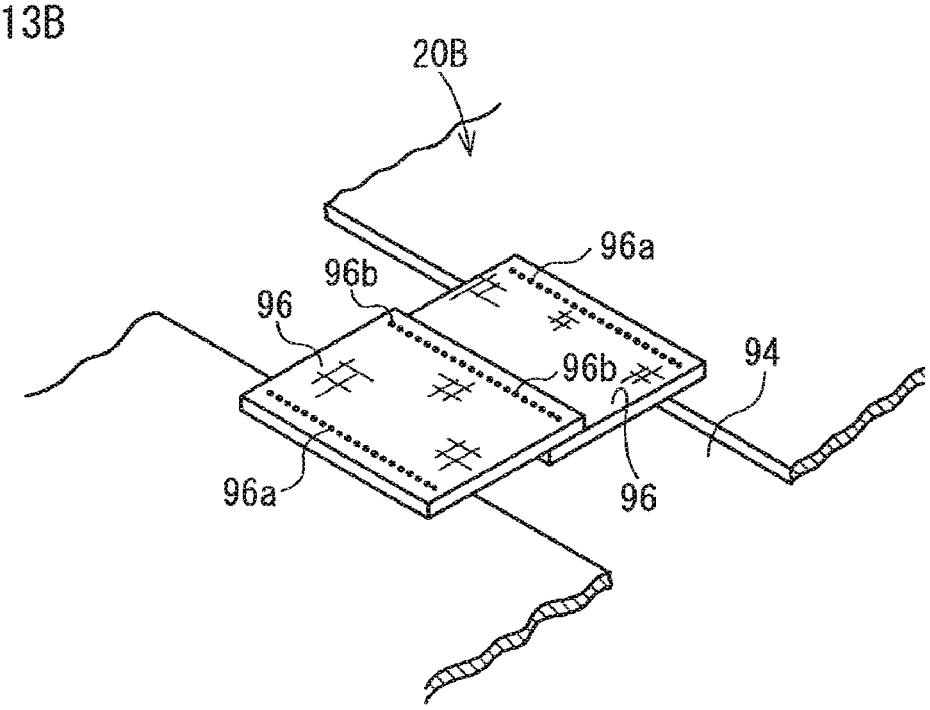

In the inside panel 20B of FIG. 13A, the base-end side of a small panel 96 is stitched to the edges of the narrow portion of the opening 94, on the vehicle front and rear sides, respectively, by a seam 96a. As shown in FIG. 13B, the front end of one small panel 96 and the front end of the other small panel 96 are stitched together by a seam 96b. That is, a front-back tether made of a small panel connecting body that connects the small panels 96 and 96 crosses the opening 94.

Figure 14A:
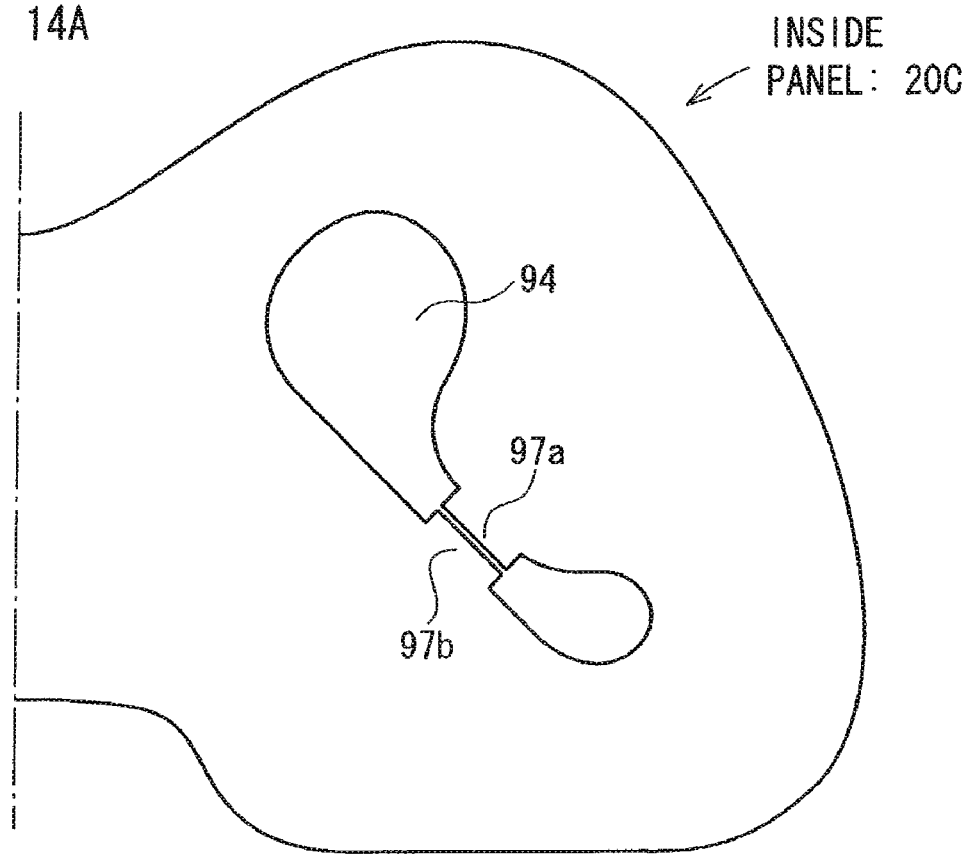
FIG. 14 is a schematic view of the inside panel.
Figure 14B:
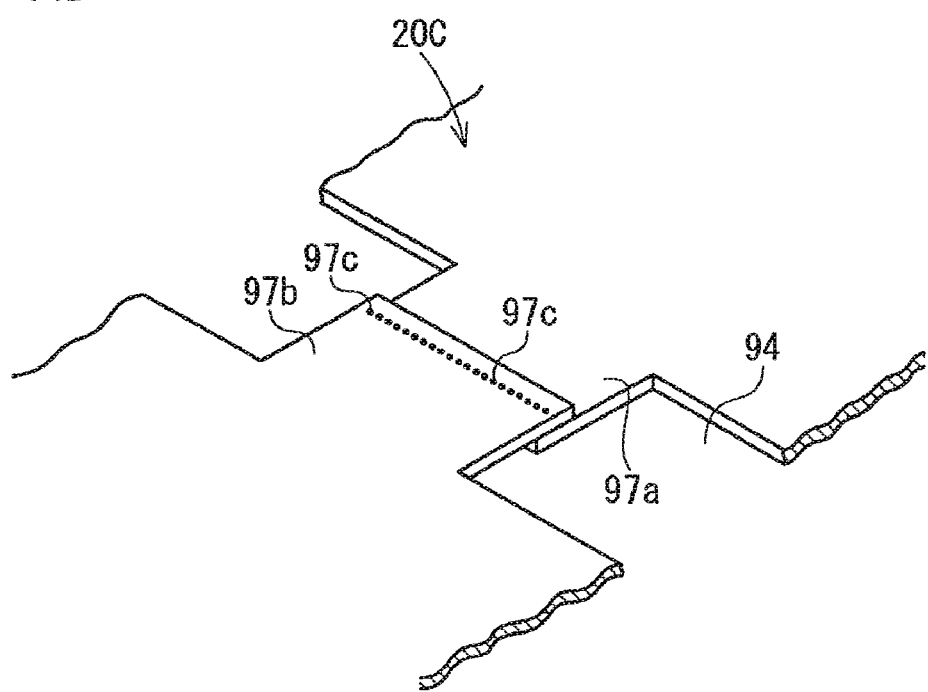

In the inside panel 20C of FIG. 14, small panels 97a and 97b protrude from the edges of the narrow portion of the opening 94, on the vehicle front and rear sides, respectively. The small panels 97a and 97b are provided in an integrated manner with the base fabric of the inside panel 20C. As shown in FIG. 14B, the front ends of the small panel 97a and the small panel 97b are stitched together by a seam 97c. That is, the front-back tether made of the connected body formed by the small panels 97a and 97b crosses the opening 94.

An airbag manufactured using these inside panels 20A to 20C achieves the same advantages as the airbag of the above embodiment. Furthermore, shortening the length of the front-back tether 95 or the length in the lateral direction of the opening of the front-back tether made of the connecting body of the small panel 96 or the connecting body of the small panel 97 of the inside panels 20A to 20C makes it possible to increase the depth $d_2$ of the intermediate part of the concave portion 13.

FIG. 25 is a vertical cross-sectional view of the same part as FIG. 3 of an airbag 10J according to yet another embodiment.

In this airbag 10J, the depth of the intermediate part of the concave portion 13 is as deep as the upper side.

That is, according to this embodiment, the part of the seam 90S that extends vertically on the vehicle rear side runs along the rear edge of the opening 91, curving toward the vehicle rear side in the upper part of the concave portion 13. The part of the seam 90S that extends vertically on the vehicle rear side curves in the intermediate part of the concave portion 13 (that is, in the range L) in the vicinity of the opening 91 (that is, in the upper end vicinity of the range L) along the lower edge of the opening 91 so that it protrudes toward the vehicle rear side, then extends gradually downward at an angle toward the vehicle rear side, curving in the lower part of the concave portion 13 so that it protrudes toward the vehicle rear side along the rear edge of the opening 92. That is, the part of the seam 90S that extends vertically on the vehicle rear side extends into a shape substantially like the numeral "7" (the substantial "7" shape horizontally flipped in FIG. 25) in the intermediate part of the concave portion 13. With this arrangement, the depth of the concave portion 13 suddenly increases on the lower side of the upper part of the concave portion 13 (i.e., in the vicinity of the upper end of the range L), and then gradually decreases in the downward direction.

A distance q from the upper end of the range L to a deepest portion 13b of the concave portion 13 of the airbag 10J is preferably 0 to 250 mm, more preferably 0 to 150 mm.

A depth $d_2'$ of a deepest portion 13b the airbag 10J from the surface of the airbag 10J facing the occupant is preferably 25 to 400 mm, more preferably 50 to 350 mm.

In the seam 90S, an upward angle θ from the horizontal plane of a part that is lower than the lower side of the deepest part 13b of the concave portion 13 and extends on an angle toward the vehicle rear side is preferably 25 to 50°, more preferably about 30 to 45°.

Other arrangements in FIG. 25 are the same as those in FIG. 3, and the reference numerals identical to those in FIG. 3 denote the same components.

According to this airbag 10J, the intermediate part of the concave portion 13 is as deep as the upper side. Therefore, as shown in FIG. 25, the head portion of the small occupant P that has advanced forward into the concave portion 13 in a forward leaning position enters deep into this concave portion 13. With this arrangement, the head portion of the small occupant P does not shift left and right and is securely held within the concave portion 13. Further, in the area below the deepest portion 13b of the concave portion 13, the inmost surface of the concave portion 13 inclines toward the vehicle front. As a result, when the face of the small occupant P reaches the inmost surface, the orientation of the face substantially matches that of the inmost surface. With this arrangement, the load on the neck of the occupant is minimized.

Note that the modifications of FIGS. 12 to 24 are applicable to FIG. 25 as well.

Figure 26:
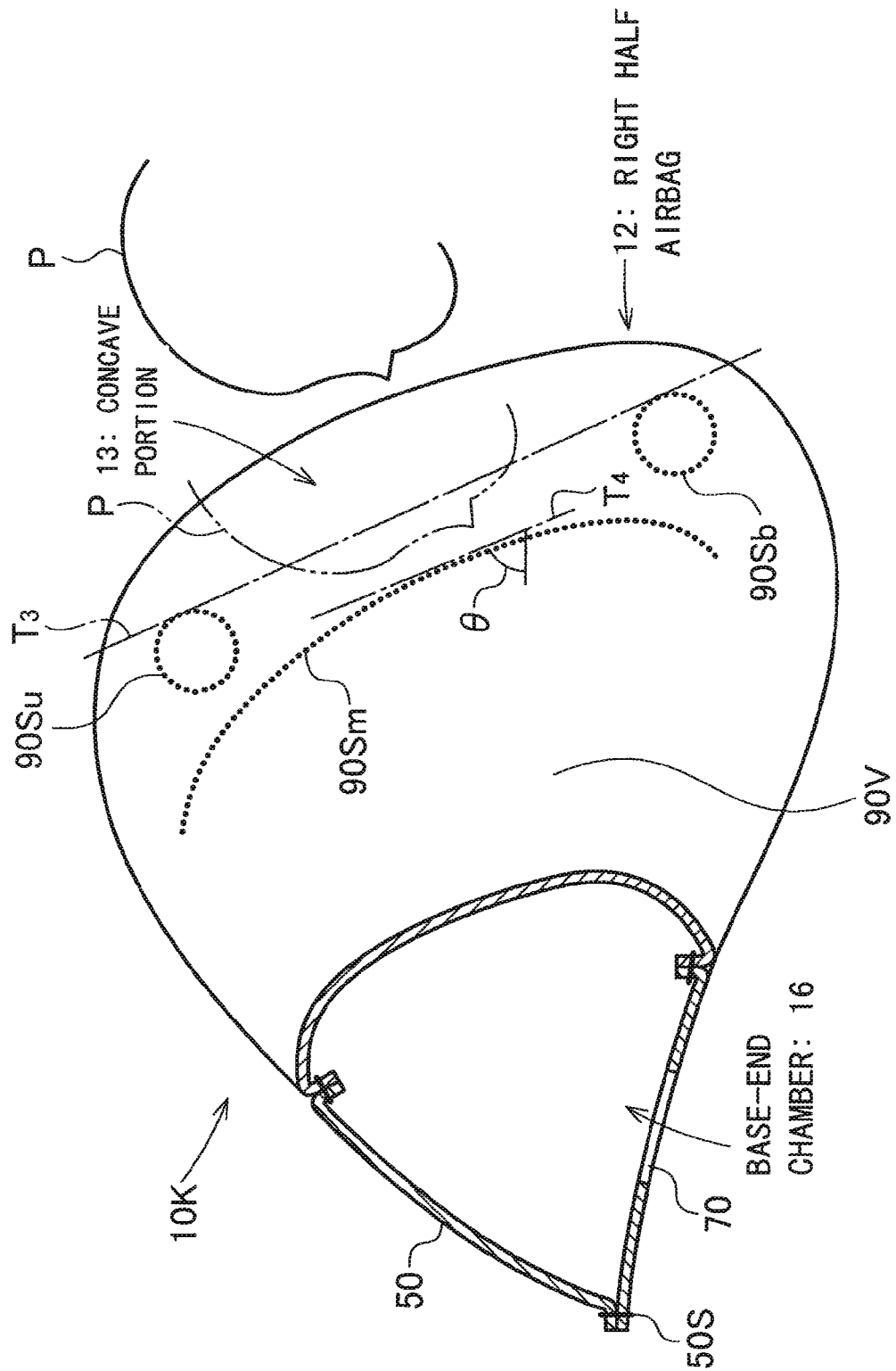
FIG. 26 is a vertical cross-sectional view in the front-back direction of the airbag in an inflated state according to an embodiment of the present invention.

FIG. 26 is a vertical cross-sectional view of the same part as FIG. 3 of an airbag 10K according to yet another embodiment.

In the airbag 10K, a seam that stitches the two face-to-face surfaces of the right half airbag 12 and the left half airbag 14 comprises an upper seam 90Su that stitches the upper parts of the two surfaces together, a lower seam 90Sb that stitches the lower parts of the two surfaces together, and a middle seam 90Sm that stitches together the intermediate parts of the two surfaces.

The upper seam 90Su extends in a circular shape on the upper side of the concave portion 13. The lower seam 90Sb extends in a circular shape on the lower side of the concave portion 13. The middle seam 90Sm extends in the substantial vertical direction in the intermediate part of the concave portion 13. Note that while the opening 91 on the upper side and the opening 92 on the lower side of the concave portion 13 are omitted in this embodiment, in a case where the openings 91 and 92 are provided, the upper seam 90Su and the lower seam 90Sb may be extended to wrap around the openings 91 and 92, respectively. As shown in FIG. 26, these seams 90Su, 90Sb, and 90Sm are mutually discontinuous. The middle seam 90Sm is positioned closer to the vehicle front side than the upper seam 90Su and the lower seam 90Sb. According to this embodiment, the upper end of the middle seam 90Sm extends through the vehicle front side of the upper seam 90Su to the vicinity of the upper end of the airbag 10K, and the lower end of the middle seam 90Sm extends through the vehicle front side of the lower seam 90Sb to the vicinity of the lower end of the airbag 10K.

In this airbag 10K, the upper seam 90Su is the inmost part of the upper part of the concave portion 13, the middle seam 90Sm is the inmost part of the intermediate part of the concave portion 13, and the lower seam 90Sb is the inmost part of the lower part of the concave portion 13.

According to this embodiment, the middle seam 90Sm curves, extending toward the vehicle rear side in general. Note that this middle seam 90Sm is positioned closer to the vehicle front side than a tangential line T3 that is tangent to both the upper seam 90Su and the lower seam 90Sb from the vehicle rear side, even in the part of the airbag 10K that is closest to the surface facing the occupant. Therefore, even when the middle seam 90Sm thus curves protruding toward the vehicle rear side, the intermediate part of the concave portion 13 is deeper than the upper and lower parts.

According to this embodiment, a tangential line T4 which is tangent to a convex-shaped curve of the middle seam 90Sm in the vicinity of the intermediate part between the upper seam 90Su and the lower seam 90Sb inclines toward the vehicle front. The upward inclination angle θ from the horizontal plane of this tangential line T4 is preferably 25 to 50°, more preferably about 30 to 45°.

Other arrangements in FIG. 26 are the same as those in FIG. 3, and the reference numerals identical to those in FIG. 3 denote the same components.

In the airbag 10K as well, the same advantages as those of the airbag 10 in FIGS. 1 to 7 are achieved.

Note that, in FIG. 26, the middle seam 90Sm may curve so that it protrudes toward the vehicle front side. Further, the middle seam 90Sm may extend substantially linearly.

FIG. 27 is a vertical cross-sectional view of the same part as FIG. 3 of an airbag 10L according to yet another embodiment.

In this airbag 10L, the seam that stitches together the two face-to-face surfaces of the right half airbag 12 and the left half airbag 14 comprises a main seam 90Sm' that continuously stitches together the two surfaces from the upper part to the lower part, and the upper seam 90Su that stitches together the upper parts of the two surfaces.

In this embodiment as well, the upper seam 90Su extends in a circular shape on the upper side of the concave portion 13. The main seam 90Sm' extends substantially vertically from the upper part toward the lower part of the concave portion 13. Note that while the openings 91 and 92 on the upper and lower sides of the concave portion 13 are omitted in this embodiment as well, in a case where the opening 91 is provided, the upper seam 90Su may extend so that it wraps around the opening 91. As shown in FIG. 27, these seams 90Su and 90Sm' are mutually discontinuous. The main seam 90Sm' is positioned closer to the vehicle front side than the upper seam 90Su in the intermediate part of the concave portion 13. Furthermore, according to this embodiment as well, the upper end of the main seam 90Sm' extends through the vehicle front side of the upper seam 90Su to the vicinity of the upper end of the airbag 10L.

In the intermediate part of the concave portion 13, the main seam 90Sm' extends on an angle in a substantially linear shape to the vehicle front side, to the extent of the upper side. The upward inclination angle θ from the horizontal plane of this part is preferably 25 to 50°, more preferably about 30 to 45°. The upper and lower ends of the main seam 90Sm each curve in a substantial arc shape toward the vehicle front side. The main seam 90Sm' is continuously formed with the middle seam 90Sm and the lower seam 90Sb of FIG. 26. Note that the lower end of the main seam 90Sm' may be circular in shape, similar to the lower seam 90Sb of FIG. 26. When the opening 92 is provided on the lower side of the concave portion 13, the lower end of the main seam 90Sm' may extend so that it wraps around the opening 92.

In the airbag 10L, the upper seam 90Su is the inmost part of the upper part of the concave portion 13, and the main seam 90Sm' is the inmost part of the intermediate part and lower part of the concave portion 13. The main seam 90Sm' is positioned closer to the vehicle front side than the upper seam 90Su, and extends at an angle toward the vehicle rear side to the extent of the lower end, thereby making the intermediate part of the concave portion 13 deeper than the upper and lower parts thereof.

Other arrangements in FIG. 27 are the same as those in FIG. 3, and the reference numerals identical to those in FIG. 3 denote the same components.

In the airbag 10L as well, the same advantages as those of the airbag 10 in FIGS. 1 to 7 are achieved.

Note that, in FIG. 27 as well, the main seam 90Sm' may curve so that it protrudes toward the vehicle front side, may curve so that it protrudes to the vehicle rear side, or may be linear in shape. The upper seam 90Su may be omitted as well.

While the invention has been explained with reference to the specific embodiments of the invention, the explanation is illustrative and the invention may be practiced in various other forms.

The inside panel 20 and the outside panel 80, as shown in FIGS. 28A, 28B, 29A, and 29B, are preferably symmetrical in shape when spread horizontally flat on a flat surface. The thread line of the left side 20L (in the direction the base fabric thread extends) and the thread line of the right side 20R are 0° and 90° (refer to FIG. 28A) or 45° (refer to FIG. 28B) with respect to a centerline (vertical line that passes through the lateral middle of the inside panel 20) $CL_1$ of the inside panel 20.

Similarly, the thread line of the outside panel 80 is °0 and 90° (refer to FIG. 29A) or 45° (refer to FIG. 29B) with respect to a centerline (vertical line that passes through the lateral middle of the outside panel 80) $CL_2$ of the outside panel 80.

With the thread lines of the panels 20 and 80 being symmetrical, the levels of strength of the left half airbag 14 and the right half airbag 12 are equalized.

Figure 28A:
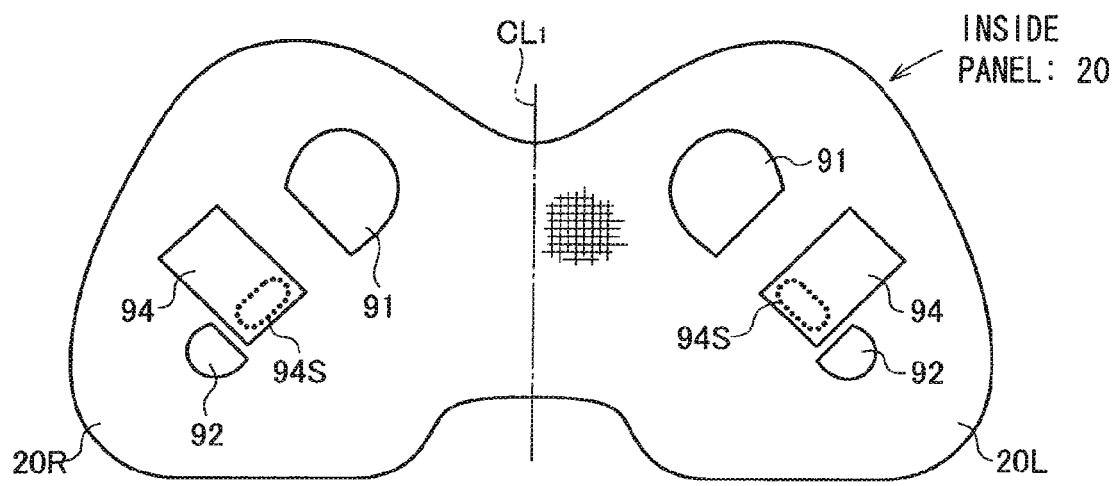
FIG. 28 is a plane view showing the thread line direction of the inside panel.
Figure 28B:
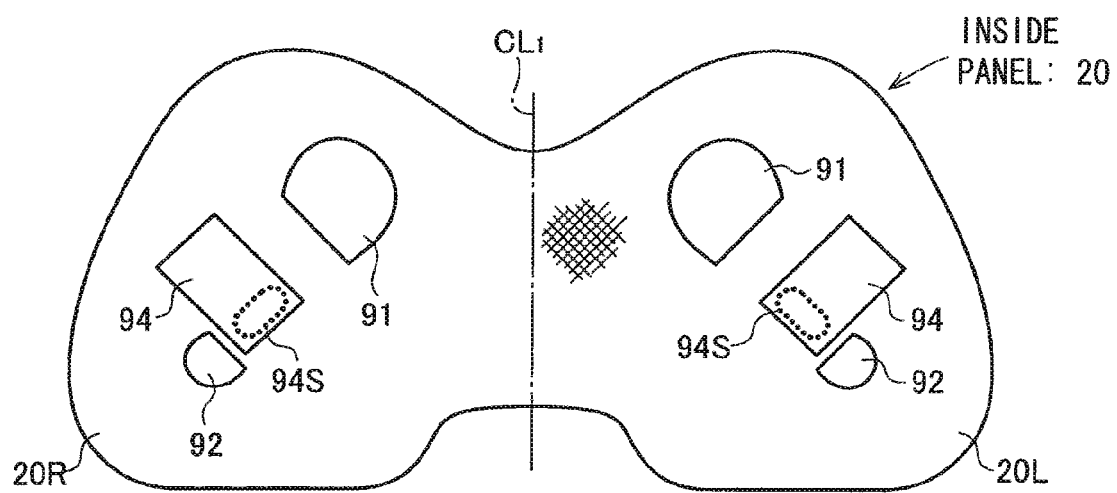
Figure 29A:
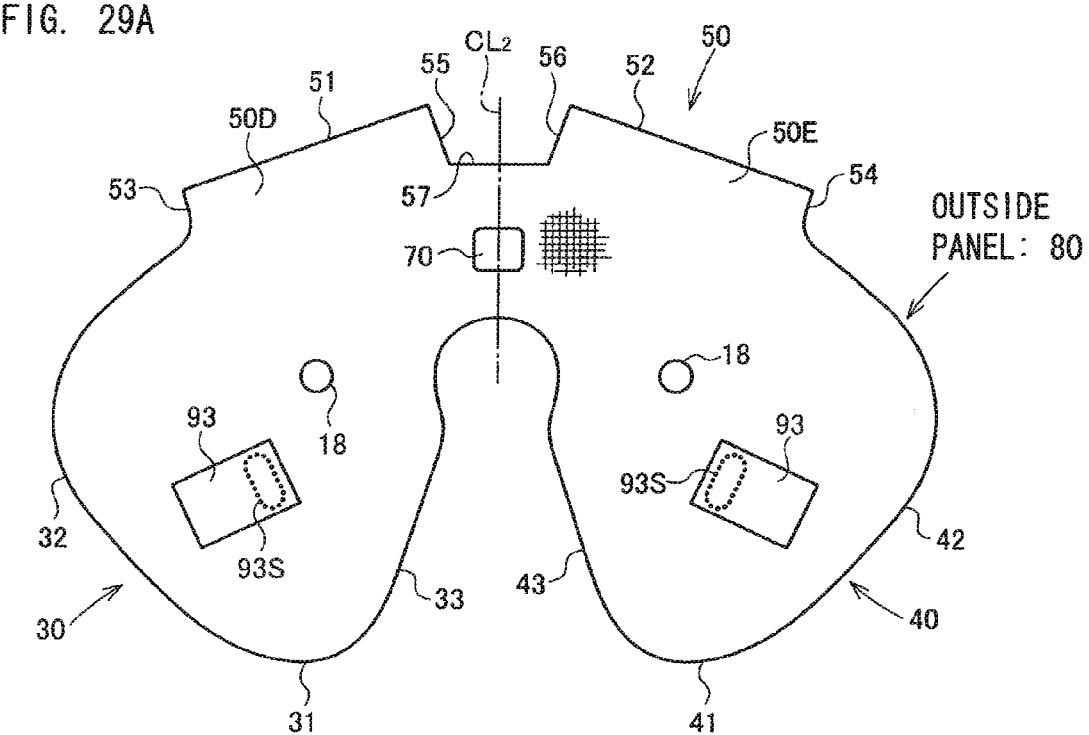
FIG. 29 is a plane view showing the thread line direction of the outside panel.
Figure 29B:
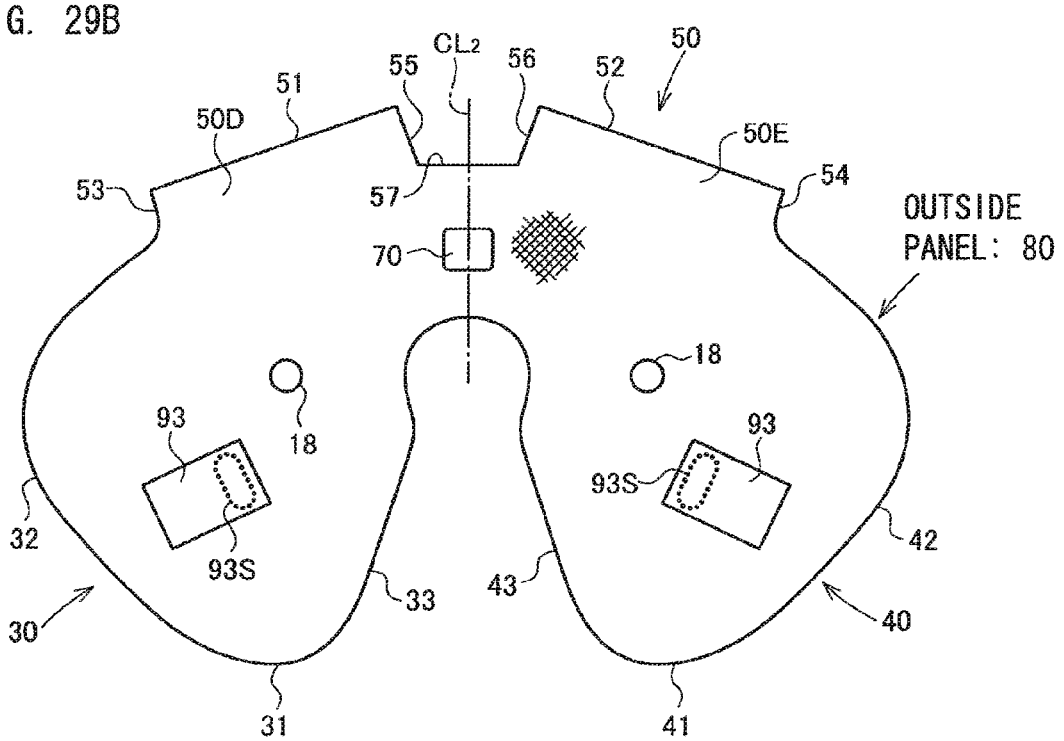

When both of the panels 20 and 80 are designed so that the thread lines are in the same direction (preferably 0° and 90°) with respect to the centerlines $CL_1$ and $CL_2$, respectively, and both of the panels 20 and 80 are spread flat as shown in FIG. 28A and FIG. 29A and placed on top of each other, the thread lines of both of the panels 20 and 80 become parallel to each other.

Figure 30A:
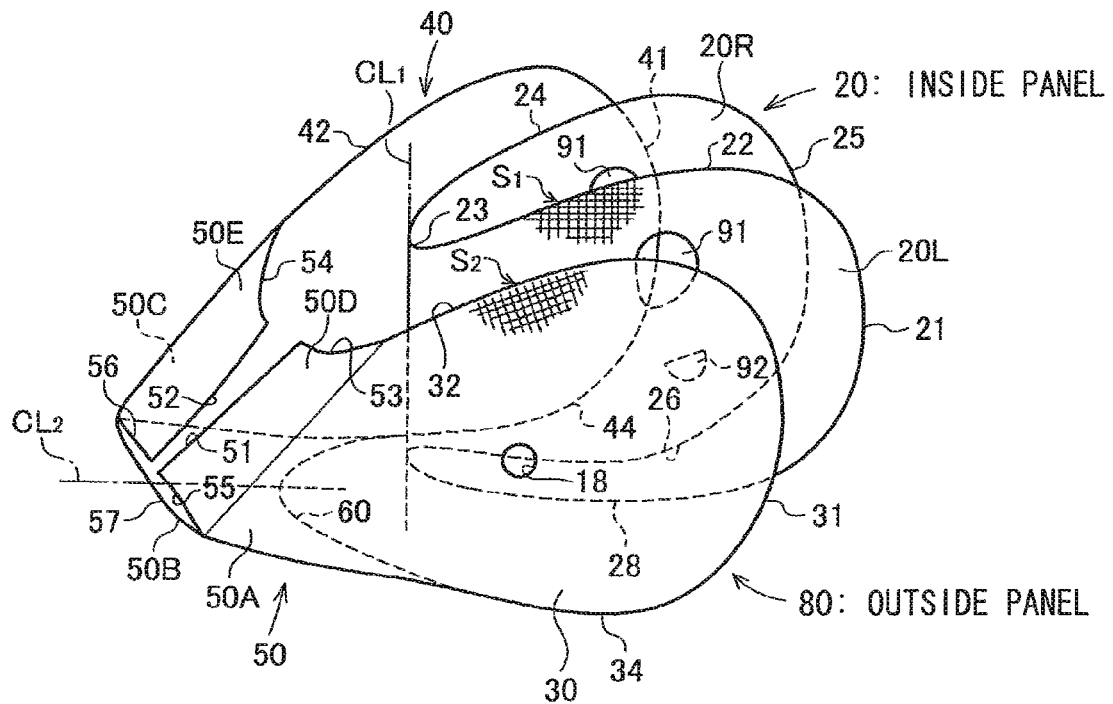
FIG. 30 is an exploded perspective view of the inside panel and the outside panel, and a plane view in the vicinity of the stitching portion of the inside panel outer periphery and the outside panel outer periphery.

In the above embodiment, as shown in FIG. 30A, the inside panel 20 is folded in two along the centerline $CL_1$ (flat fold) when manufacturing the airbag 10. Conversely, the outside panel 80 is folded (three-dimensionally) so that the mouth surface 50 on the base-end side has the bottom 50B, the left/right side surfaces 50A and 50C, and an upper surface (the flaps 50D and 50E), thereby forming a rectangular shape that has a surface open to the front end of the airbag.

Figure 30B:
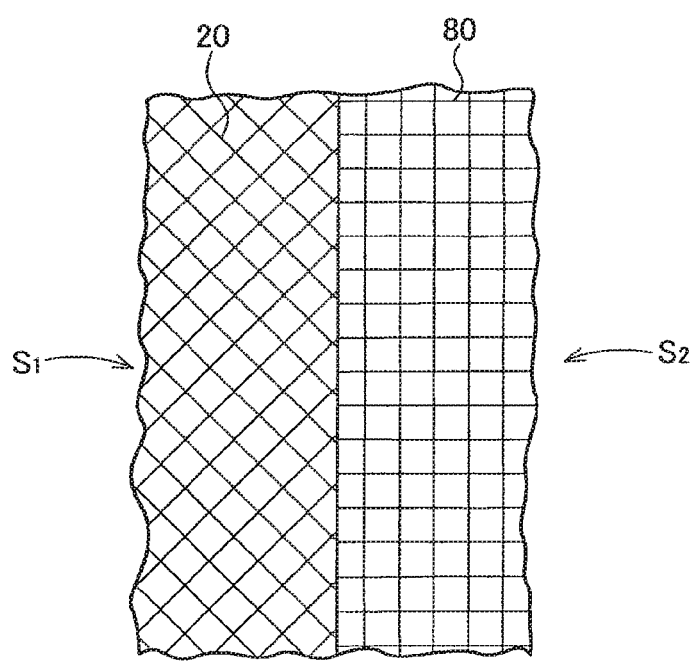

With this arrangement, in the above embodiment, as described above, even if the thread line directions of both panels 20 and 80 are in the same direction with respect to the centerlines $CL_1$ and $CL_2$, respectively, as shown in FIG. 30B, the outer periphery of the panel 20 and the outer periphery of the panel 80 overlap with the thread lines in different directions (non-parallel directions). With the panels 20 and 80 thus stitched together with the thread lines in non-parallel directions, the stitch strength of both the panels 20 and 80 is higher compared to a case where stitching is performed with the thread lines parallel.

Furthermore, with the panels 20 and 80 having thread lines at 0° and 90° with respect to the centerlines $CL_1$ and $CL_2$, the unused sections that remain when the base cloth is cut out from the band of fabric (cloth) is minimized, thereby improving cutout efficiency. That is, the number of panels 20 and 80 that can be cut out from the cloth of a unit length increases.

What is claimed is:

1. An airbag comprising:
a base-end chamber disposed on a vehicle front side;
a left half airbag that is continuous with said base-end chamber and is to be inflated on a front left side of an occupant;
a right half airbag that is continuous with said base-end chamber and is to be inflated on a front right side of the occupant;
a hollow portion that extends in a substantially vertical direction outside said airbag between the left half airbag and the right half airbag at the occupant side of said base-end chamber in an inflated state;
a vertically extended concave portion formed by means of joining said left half airbag and said right half airbag by stitching on mutually face-to-face portions at the occupant side of said hollow portion in an inflated state so as to face said occupant;
a depth of said concave portion in an intermediate part along the vertical direction being greater than both of a depth of said concave portion in an upper part and a depth of said concave portion in a lower part.

2. The airbag according to claim 1, wherein:
seams of said stitching includes:
an upper seam that stitches together an upper part of said face-to-face portion of said left half airbag and an upper part of said face-to-face portion of said right half airbag;
a middle seam that stitches together an intermediate part of said face-to-face portion of said left half airbag and an intermediate part of said face-to-face portion of said right half airbag; and
a lower seam that stitches together a lower part of said face-to-face portion of said left half airbag and a lower part of said face-to-face portion of said right half airbag; wherein:
at least a part of said middle seam is positioned on a vehicle front side, further away from a surface of said airbag facing an occupant than said upper seam and said lower seam, when said airbag is inflated.

3. The airbag according to claim 2, wherein:
said upper seam, said lower seam, and said middle seam form a continuous seam that extends along a substantial vertical direction; and
at least a part of said middle seam curves away from the surface facing said occupant.

4. The airbag according to claim 2, wherein:
at least said upper seam and said middle seam are discontinuous; and
an upper side of said middle seam is positioned closer to a vehicle front side than said upper seam.

5. The airbag according to claim 1, further comprising:
said left half airbag and said right half airbag are configured to be pressed together on a vehicle front side more than said intermediate part of said concave portion when the airbag is inflated.

6. The airbag according to claim 1, further comprising right-left tethers for decreasing a width along a lateral direction when said left half airbag and said right half airbag are inflated, wherein
each of said right-left tethers is stitched to said left half airbag or said right half airbag by a seam of said stitching.

7. The airbag according to claim 1, wherein:
in an airbag inflated state, a depth $d_1$ of said concave portion from the surface of said airbag facing the occupant in said upper part is 5 to 200 mm;
in the airbag inflated state, a depth $d_2$ of said concave portion from the surface facing the occupant in said intermediate part is 25 to 400 mm;
in the airbag inflated state, a depth $d_3$ of said concave portion from the surface facing the occupant in said lower part is 5 to 200 mm; and
in the airbag inflated state, a depth $d_4$ of said intermediate part of said concave portion from a tangent line tangent to an inmost part of said upper part of said concave portion and an inmost part of said lower part of said concave portion is 0 to 200 mm.

8. The airbag according to claim 7, wherein:
said concave portion in said intermediate part is a portion having the depth $d_2$ is 25 to 400 mm, and
the concave portion in said intermediate part extends 150 to 400 mm in a vertical direction.

9. The airbag according to claim 8, wherein:
in the intermediate part, the more the concave portion is in an upper part, the more a depth of the concave portion is greater.

10. The airbag according to claim 7, wherein:
said concave portion in said intermediate part is configured so that a direction of a tangent line within a vertical plane of at least one portion of an inmost part of the concave portion is inclined toward a vehicle front.

11. The airbag according to claim 1, further comprising
at least one front-back tether for pulling said concave portion of said intermediate part toward a vehicle front.

12. The airbag according to claim 1 wherein: said airbag inflates from an instrument panel of the vehicle toward a vehicle rear so as to approach the occupant; wherein:
said hollow portion is configured so that, when said airbag is in the inflated state, at least one portion of a lower end side of said hollow portion is positioned closer to a vehicle rear than an end portion on a vehicle rear side of the instrument panel.

13. An airbag device having the airbag according to claim 1, further comprising
an inflator that inflates said airbag.

14. A vehicle having the airbag device according to claim 13.

15. An airbag configured to inflate in front of a front-passenger seat occupant, the airbag comprising:
a base-end chamber having an opening configured to lead a gas from an inflator into the airbag;
a right airbag that is connected to said base-end chamber so as to be positioned at the occupant side from said base-end chamber in an inflated state, and is to be inflated on a front right side of the occupant by means of being supplied the gas from said base-end chamber;
a left airbag that is connected to said base-end chamber so as to be positioned at the occupant side from said base-end chamber in an inflated state, and is to be inflated on a front left side of the occupant by means of being supplied the gas from said base-end chamber;
a hollow portion that is positioned at the occupant side from said base-end chamber in an inflated state, and is to be formed between a panel at a left side of said right airbag and a panel at a right side of said left airbag, the panel and the panel facing to each other beyond a predetermined distance;
an approximately ring-shaped stitching portion that is positioned at the occupant side from said hollow portion in an inflated state, and is to be formed by means of joining the panel at a left side of said right airbag and the panel at a right side of said left airbag by stitching;
at least one connection opening that is disposed in an inner portion from the approximately ring-shaped stitching portion of each of the panel at a left side of said right airbag and the panel at a right side of said left airbag, and connects said right airbag and said left airbag;
a vertically extended concave portion that is positioned at further the occupant side from an occupant side portion of said stitching portion in an inflated state, and is to be formed between the panel at a left side of said right airbag and the panel at a right side of said left airbag so as to face said occupant, the panel and the panel facing to each other beyond the predetermined distance;
a depth of said concave portion in an intermediate part along a vertical direction being greater than both of a depth of said concave portion in an upper part along the vertical direction and a depth of said concave portion in a lower part along the vertical direction.

* * * * *